(12) United States Patent
Srinivasan et al.

(10) Patent No.: US 8,184,710 B2
(45) Date of Patent: May 22, 2012

(54) ADAPTIVE TRUNCATION OF TRANSFORM COEFFICIENT DATA IN A TRANSFORM-BASED DIGITAL MEDIA CODEC

(75) Inventors: Sridhar Srinivasan, Redmond, WA (US); Chengjie Tu, Sammamish, WA (US); Shankar Regunathan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1208 days.

(21) Appl. No.: 11/772,077

(22) Filed: Jun. 29, 2007

(65) Prior Publication Data

US 2008/0198933 A1     Aug. 21, 2008

Related U.S. Application Data

(60) Provisional application No. 60/891,035, filed on Feb. 21, 2007.

(51) Int. Cl.
*H04N 7/12* (2006.01)
*H04N 11/04* (2006.01)

(52) U.S. Cl. .............................. 375/240.18; 375/E7.03

(58) Field of Classification Search .................. None
See application file for complete search history.

(56) References Cited

U.S. PATENT DOCUMENTS

| | | | |
|---|---|---|---|
| 4,420,771 A | 12/1983 | Pirsch | |
| 4,698,672 A | 10/1987 | Chen | |
| 4,730,348 A | 3/1988 | MacCrisken | |
| 4,744,085 A | 5/1988 | Fukatsu | |
| 4,749,983 A | 6/1988 | Langdon, Jr. | |
| 4,792,981 A | 12/1988 | Cahill et al. | |
| 4,813,056 A | 3/1989 | Fedele | |
| 4,901,075 A | 2/1990 | Vogel | |
| 4,958,302 A * | 9/1990 | Fredrickson et al. | 345/544 |
| 4,961,153 A * | 10/1990 | Fredrickson et al. | 345/422 |
| 4,965,751 A * | 10/1990 | Thayer et al. | 345/572 |
| 4,968,135 A | 11/1990 | Wallace et al. | |
| 5,043,919 A | 8/1991 | Callaway et al. | |
| 5,089,818 A | 2/1992 | Mahieux et al. | |
| 5,109,451 A | 4/1992 | Aono et al. | |
| 5,128,758 A | 7/1992 | Azadegan | |
| 5,146,324 A | 9/1992 | Miller et al. | |
| 5,179,442 A | 1/1993 | Azadegan | |
| 5,227,788 A | 7/1993 | Johnston | |
| 5,227,878 A | 7/1993 | Puri et al. | |
| 5,266,941 A | 11/1993 | Akeley et al. | |

(Continued)

FOREIGN PATENT DOCUMENTS

EP        0 540 350        5/1993

(Continued)

OTHER PUBLICATIONS

Chiang et al., "A Radix-2 Non-Restoring 32-b/32-b Ring Divider with Asynchronous Control Scheme," Tamkang Journal of Science and Engineering, vol. 2, No. 1, pp. 37-43 (1999).

(Continued)

*Primary Examiner* — Christopher Revak

(74) *Attorney, Agent, or Firm* — Klarquist Sparkman, LLP

(57) ABSTRACT

A block transform-based digital media codec has a signaling scheme and bitstream syntax to flexibly signal that truncation of less significant information bits of transform coefficients coded as an optional layer of the bitstream has been performed adaptively per region or tile of the image.

18 Claims, 11 Drawing Sheets

U.S. PATENT DOCUMENTS

| | | | |
|---|---|---|---|
| 5,270,832 A | 12/1993 | Balkanski et al. | |
| 5,376,968 A | 12/1994 | Wu et al. | |
| 5,381,144 A | 1/1995 | Wilson et al. | |
| 5,394,170 A | 2/1995 | Akeley et al. | |
| 5,400,075 A | 3/1995 | Savatier | |
| 5,408,234 A | 4/1995 | Chu | |
| 5,457,495 A | 10/1995 | Hartung | |
| 5,461,421 A | 10/1995 | Moon | |
| 5,467,134 A | 11/1995 | Laney | |
| 5,481,553 A | 1/1996 | Suzuki | |
| 5,493,407 A | 2/1996 | Takahara | |
| 5,504,591 A | 4/1996 | Dujari | |
| 5,508,816 A | 4/1996 | Ueda et al. | |
| 5,533,140 A | 7/1996 | Sirat et al. | |
| 5,535,305 A | 7/1996 | Acero et al. | |
| 5,544,286 A | 8/1996 | Laney | |
| 5,559,557 A | 9/1996 | Kato et al. | |
| 5,568,167 A | 10/1996 | Galbi et al. | |
| 5,574,449 A | 11/1996 | Golin | |
| 5,579,430 A | 11/1996 | Grill et al. | |
| 5,592,584 A | 1/1997 | Ferreira et al. | |
| 5,627,938 A | 5/1997 | Johnston | |
| 5,654,706 A | 8/1997 | Jeong et al. | |
| 5,661,755 A | 8/1997 | Van De Kerkhof | |
| 5,664,057 A | 9/1997 | Crossman et al. | |
| 5,714,950 A | 2/1998 | Jeong et al. | |
| 5,717,821 A | 2/1998 | Tsutsui | |
| 5,732,156 A | 3/1998 | Watanabe et al. | |
| 5,748,789 A | 5/1998 | Lee et al. | |
| 5,793,897 A | 8/1998 | Jo et al. | |
| 5,802,213 A | 9/1998 | Gardos | |
| 5,812,971 A | 9/1998 | Herre | |
| 5,819,215 A | 10/1998 | Dobson et al. | |
| 5,825,830 A | 10/1998 | Kopf | |
| 5,825,979 A | 10/1998 | Tsutsui et al. | |
| 5,828,426 A | 10/1998 | Yu | |
| 5,831,559 A | 11/1998 | Agarwal et al. | |
| 5,835,144 A | 11/1998 | Matsumura | |
| 5,844,508 A | 12/1998 | Murashita et al. | |
| 5,850,482 A | 12/1998 | Meany et al. | |
| 5,883,633 A | 3/1999 | Gill et al. | |
| 5,884,269 A | 3/1999 | Cellier et al. | |
| 5,889,891 A | 3/1999 | Gersho et al. | |
| 5,896,176 A | 4/1999 | Das et al. | |
| 5,946,043 A | 8/1999 | Lee et al. | |
| 5,959,674 A | 9/1999 | Jang et al. | |
| 5,969,650 A | 10/1999 | Wilson et al. | |
| 5,974,184 A | 10/1999 | Eifrig et al. | |
| 5,974,380 A | 10/1999 | Smyth et al. | |
| 5,982,437 A | 11/1999 | Okazaki | |
| 5,983,172 A | 11/1999 | Takashima et al. | |
| 5,990,960 A | 11/1999 | Murakami | |
| 5,991,451 A | 11/1999 | Keith et al. | |
| 5,995,670 A | 11/1999 | Zabinsky | |
| 6,002,439 A | 12/1999 | Murakami | |
| 6,026,195 A | 2/2000 | Eifrig et al. | |
| 6,038,536 A | 3/2000 | Haroun et al. | |
| 6,041,302 A | 3/2000 | Bruekers | |
| 6,049,630 A | 4/2000 | Wang et al. | |
| 6,054,943 A | 4/2000 | Lawrence | |
| 6,078,691 A | 6/2000 | Luttmer | |
| 6,097,759 A | 8/2000 | Murakami | |
| 6,097,880 A | 8/2000 | Koyata | |
| 6,100,825 A | 8/2000 | Sedluk | |
| 6,111,914 A | 8/2000 | Bist | |
| 6,148,109 A | 11/2000 | Boon | |
| 6,154,572 A | 11/2000 | Chaddha | |
| 6,173,080 B1 | 1/2001 | Cho et al. | |
| 6,195,465 B1 | 2/2001 | Zandi et al. | |
| 6,205,256 B1 | 3/2001 | Chaddha | |
| 6,215,910 B1 | 4/2001 | Chaddha | |
| 6,223,162 B1 | 4/2001 | Chen | |
| 6,226,407 B1 | 5/2001 | Zabih et al. | |
| 6,233,017 B1 | 5/2001 | Chaddha | |
| 6,253,165 B1 | 6/2001 | Malvar | |
| 6,259,810 B1 | 7/2001 | Gill et al. | |
| 6,272,175 B1 | 8/2001 | Sriram et al. | |
| 6,292,588 B1 | 9/2001 | Shen | |
| 6,300,888 B1 | 10/2001 | Chen | |
| 6,304,928 B1 | 10/2001 | Mairs et al. | |
| 6,323,874 B1 * | 11/2001 | Gossett | 345/619 |
| 6,337,881 B1 | 1/2002 | Chaddha | |
| 6,341,165 B1 | 1/2002 | Gbur | |
| 6,345,123 B1 | 2/2002 | Boon | |
| 6,349,152 B1 | 2/2002 | Chaddha | |
| 6,360,019 B1 | 3/2002 | Chaddha | |
| 6,377,930 B1 | 4/2002 | Chen | |
| 6,392,705 B1 | 5/2002 | Chaddha | |
| 6,404,931 B1 | 6/2002 | Chen | |
| 6,408,029 B1 | 6/2002 | McVeigh et al. | |
| 6,420,980 B1 | 7/2002 | Ejima | |
| 6,421,738 B1 | 7/2002 | Ratan et al. | |
| 6,441,755 B1 | 8/2002 | Dietz et al. | |
| 6,477,280 B1 | 11/2002 | Malvar | |
| 6,487,535 B1 | 11/2002 | Smyth et al. | |
| 6,493,385 B1 | 12/2002 | Sekiguchi et al. | |
| 6,542,631 B1 | 4/2003 | Ishikawa | |
| 6,542,863 B1 | 4/2003 | Surucu | |
| 6,567,781 B1 | 5/2003 | Lafe | |
| 6,573,915 B1 | 6/2003 | Sivan et al. | |
| 6,580,834 B2 | 6/2003 | Li et al. | |
| 6,587,057 B2 | 7/2003 | Scheuermann | |
| 6,608,935 B2 | 8/2003 | Nagumo et al. | |
| 6,636,168 B2 | 10/2003 | Ohashi et al. | |
| 6,646,578 B1 | 11/2003 | Au | |
| 6,650,784 B2 | 11/2003 | Thyagarajan | |
| 6,678,419 B1 | 1/2004 | Malvar | |
| 6,683,980 B1 | 1/2004 | Meier et al. | |
| 6,704,360 B2 | 3/2004 | Haskell et al. | |
| 6,721,700 B1 | 4/2004 | Yin | |
| 6,728,317 B1 | 4/2004 | Demos | |
| 6,766,293 B1 | 7/2004 | Herre | |
| 6,771,777 B1 | 8/2004 | Gbur | |
| 6,795,584 B2 | 9/2004 | Karczewicz et al. | |
| 6,825,847 B1 | 11/2004 | Molnar et al. | |
| 6,829,299 B1 | 12/2004 | Chujoh et al. | |
| 6,925,249 B1 | 8/2005 | Meier et al. | |
| 6,934,677 B2 | 8/2005 | Chen et al. | |
| 7,016,547 B1 | 3/2006 | Smirnov | |
| 7,107,212 B2 | 9/2006 | Van Der Vleuten et al. | |
| 7,136,066 B2 * | 11/2006 | Li et al. | 345/428 |
| 7,139,703 B2 | 11/2006 | Acero et al. | |
| 7,165,028 B2 | 1/2007 | Gong | |
| 7,305,174 B2 * | 12/2007 | Meier et al. | 386/329 |
| 7,308,146 B2 * | 12/2007 | Becker et al. | 382/233 |
| 7,479,957 B2 * | 1/2009 | Li et al. | 345/419 |
| 7,492,950 B2 | 2/2009 | Suzuki et al. | |
| 7,565,018 B2 | 7/2009 | Srinivasan | |
| 2002/0009145 A1 * | 1/2002 | Natarajan et al. | |
| 2002/0111780 A1 | 8/2002 | Sy | |
| 2003/0006917 A1 | 1/2003 | Ohashi et al. | |
| 2003/0033143 A1 | 2/2003 | Aronowitz | |
| 2003/0085822 A1 | 5/2003 | Scheuermann | |
| 2003/0115055 A1 | 6/2003 | Gong | |
| 2003/0138150 A1 | 7/2003 | Srinivasan | |
| 2003/0156648 A1 * | 8/2003 | Holcomb et al. | |
| 2003/0210163 A1 | 11/2003 | Yang | |
| 2004/0044521 A1 * | 3/2004 | Chen et al. | |
| 2004/0044534 A1 * | 3/2004 | Chen et al. | |
| 2004/0049379 A1 | 3/2004 | Thumpudi et al. | |
| 2004/0114810 A1 | 6/2004 | Boliek | |
| 2004/0136457 A1 * | 7/2004 | Funnell et al. | |
| 2004/0184537 A1 | 9/2004 | Geiger et al. | |
| 2005/0015249 A1 * | 1/2005 | Mehrotra et al. | |
| 2005/0021317 A1 | 1/2005 | Weng et al. | |
| 2005/0052294 A1 * | 3/2005 | Liang et al. | |
| 2006/0013303 A1 * | 1/2006 | Nguyen et al. | 375/240.11 |
| 2006/0078049 A1 * | 4/2006 | Bao et al. | 375/240.11 |
| 2008/0198933 A1 | 8/2008 | Srinivasan et al. | |
| 2010/0008424 A1 * | 1/2010 | Pace | 375/240.16 |

FOREIGN PATENT DOCUMENTS

| | | |
|---|---|---|
| EP | 0 645 930 | 3/1995 |
| EP | 0 910 927 | 1/1998 |
| EP | 0 833 520 A2 | 4/1998 |
| EP | 0 966 793 | 9/1998 |
| EP | 0 931 386 | 1/1999 |

| | | |
|---|---|---|
| EP | 1 098 528 | 5/2001 |
| EP | 1 142 130 | 4/2003 |
| EP | 1 370 087 | 12/2003 |
| EP | 1 400 954 | 3/2004 |
| EP | 1 142 129 | 6/2004 |
| EP | 1 465 431 | 10/2004 |
| EP | 1 679 903 | 7/2006 |
| GB | 2341031 | 3/2000 |
| GB | 2 372 918 | 9/2002 |
| GB | 2 388 502 | 11/2003 |
| JP | 3-60293 | 3/1991 |
| JP | 5-292481 | 11/1993 |
| JP | 6-021830 | 1/1994 |
| JP | 6-217110 | 8/1994 |
| JP | 7-274171 | 10/1995 |
| JP | 2000-23193 | 1/2000 |
| JP | 2002 204170 | 7/2002 |
| RU | 2119727 | 9/1998 |
| RU | 2123769 | 12/1998 |
| RU | 2196391 | 1/2003 |
| WO | WO 98/00924 | 1/1998 |
| WO | WO 98/21830 | 5/1998 |
| WO | WO 02/11454 | 2/2002 |

OTHER PUBLICATIONS

Search Report and Written Opinion for PCT/US06/30566 dated Sep. 28, 2007.
Costa et al., "Efficient Run-Length Encoding of Binary Sources with Unknown Statistics", Technical Report No. MSR-TR-2003-95, pp. 1-10, Microsoft Research, Microsoft Corporation (Dec. 2003).
ISO/IEC 14496-2, "Coding of Audio-Visual Object—Part 2: Visual," Third Edition, pp. 1-727, (Jun. 2004).
ITU-T Recommendation H.264, "Series H: Audiovisual and Multimedia Systems, Infrastructure of Audiovisual Services—Coding of Moving Video," International Telecommunication Union, pp. 1-262 (May 2003).
ITU-T Recommendation T.800, "Series T: Terminals for Telematic Services," International Telecommunication Union, pp. 1-194 (Aug. 2002).
Malvar, "Fast Progressive Image Coding without Wavelets", IEEE Data Compression Conference, Snowbird, Utah, 10 pp. (Mar. 2000).
U.S. Appl. No. 60/341,674, filed Dec. 2001, Lee et al.*
U.S. Appl. No. 60/488,710, filed Jul. 2003, Srinivasan et al.*
Advanced Television Systems Committee, "ATSC Standard: Digital Audio Compression (AC-3), Revision A," 140 pp. (1995).
Bosi et al., "ISO/IEC MPEG-2 Advance Audio Coding," J. Audio Eng. Soc., vol. 45, No. 10, pp. 789-812 (1997).
Brandenburg, "ASPEC Coding," *AES 10th International Conference*, pp. 81-90 (1991).
Chung et al., "A Novel Memory-efficient Huffman Decoding Algorithm and its Implementation," Signal Processing 62, pp. 207-213 (1997).
Cui et al., "A novel VLC based on second-run-level coding and dynamic truncation," *Proc. SPIE*, vol. 6077, pp. 607726-1 to 607726-9 (2006).
De Agostino et al., "Parallel Algorithms for Optimal Compression using Dictionaries with the Prefix Property," *Proc. Data Compression Conference '92, IEEE Computer Society Press*, pp. 52-62 (1992).
Gailly, "comp.compression Frequently Asked Questions (part 1/3)," 64 pp., document marked Sep. 5, 1999 [Downloaded from the World Wide Web on Sep. 5, 2007].
Gersho et al., "Vector Quantization and Signal Compression," pp. 259-305 (1992).
Gibson et al., *Digital Compression for Multimedia*, "Chapter 2: Lossless Source Coding," Morgan Kaufmann Publishers, Inc., San Francisco, pp. 17-61 (1998).
Gibson et al., *Digital Compression for Multimedia*, "Chapter 7: Frequency Domain Coding," Morgan Kaufmann Publishers, Inc., pp. 227-262 (1998).
Gill et al., "Creating High-Quality Content with Microsoft Windows Media Encoder 7," 4 pp. (2000) [ Downloaded from the World Wide Web on May 1, 2002].

Hui et al., "Matsushita Algorithm for Coding of Moving Picture Information," ISO/IEC-JTC1/SC29/WG11, MPEG91/217, 76 pp. (Nov. 1991).
International Search Report and Written Opinion for PCT/US06/30563, dated Oct. 17, 2007, 8 pages.
Ishii et al., "Parallel Variable Length Decoding with Inverse Quantization for Software MPEG-2 Decoders," IEEE Signal Processing Systems, pp. 500-509 (1997).
ISO/IEC, "ISO/IEC 11172-2, Information Technology—Coding of Moving Pictures and Associated Audio for Digital Storage Media at up to About 1.5 Mbit/s—Part 2: Video," 112 pp. (1993).
"ISO/IEC 11172-3, Information Technology—Coding of Moving Pictures and Associated Audio for Digital Storage Media at Up to About 1.5 Mbit/s—Part 3: Audio," 154 pp. (1993).
"ISO/IEC 13818-7, Information Technology—Generic Coding of Moving Pictures and Associated Audio Information—Part 7: Advanced Audio Coding (AAC)," 174 pp. (1997).
ISO/IEC, "JTC1/SC29/WG11 N2202, Information Technology—Coding of Audio-Visual Objects: Visual, ISO/IEC 14496-2," 329 pp. (1998).
ITU-T, "ITU-T Recommendation H.261, Video Codec for Audiovisual Services at $p \times 64$ kbits," 25 pp. (1993).
ITU-T, "ITU-T Recommendation H.262, Information Technology—Generic Coding of Moving Pictures and Associated Audio Information: Video," 205 pp. (1995).
ITU-T, "ITU-T Recommendation H.263, Video coding for low bit rate communication," 162 pp. (1998).
Jeong et al., "Adaptive Huffman Coding of 2-D DCT Coefficients for Image Sequence Compression," *Signal Processing: Image Communication*, vol. 7, 11 pp. (1995).
Joint Video Team (JVT) of ISO/IEC MPEG & ITU-T VCEG, "Joint Final Committee Draft (JFCD) of Joint Video Specification," JVT-D157, 207 pp. (Aug. 2002).
Joint Video Team (JVT) of ISO/IEC MPEG & ITU-T VCEG, "Draft ITU-T Recommendation and Final Draft International Standard of Joint Video Specification (ITU-T Rec. H.264, ISO/IEC 14496-10 AVC)," 253 pp. (May 2003).
Li et al., "Optimal Linear Interpolation Coding for Server-Based Computing," *Proc. IEEE Int'l Conf. on Communications*, 5 pp. (Apr.-May 2002).
Matthias, "An Overview of Microsoft Windows Media Screen Technology," 3 pp. (2000) [ Downloaded from the World Wide Web on May 1, 2002].
Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].
Mook, "Next-Gen Windows Media Player Leaks to the Web," *BetaNews*, 18 pp. (Jul. 2002) [Downloaded from the World Wide Web on Mar. 16, 2004].
Najafzadeh-Azghandi, "Perceptual Coding of Narrowband Audio Signals," Thesis, 139 pp. (Apr. 2000).
Nelson, *The Data Compression Book*, "Huffman One Better: Arithmetic Coding," Chapter 5, pp. 123-165 (1992).
OPTX International, "OPTX Improves Technology-Based Training with Screen Watch™ 3.0. Versatile Screen Capture Software Adds High Color and Live Webcast Support," 1 p., document marked Feb. 15, 2001 [Downloaded from the World Wide Web on Sep. 22, 2005].
OPTX International, "OPTX International Marks One Year Anniversary of Screen Watch With Release of New 2.0 Version," 1 p., document marked May 16, 2000 [Downloaded from the World Wide Web on Sep. 22, 2005].
OPTX International, "New Screen Watch™ 4.0 Clikc and Stream™ Wizard from OPTX International Makes Workplace Communication Effortless," 1 p., document marked Sep. 24, 2001 [Downloaded from the World Wide Web on Sep. 22, 2005].
Palmer et al., "Shared Desktop: A Collaborative Tool for Sharing 3-D Applications Among Different Window Systems," *Digital Tech. Journal*, vol. 9, No. 3, pp. 42-49 (1997).
Printouts of FTP directories from http://ftp3.itu.ch, 8 pp. [Downloaded from the World Wide Web on Sep. 20, 2005].
Reader, "History of MPEG Video Compression—Ver. 4.0," 99 pp., document marked Dec. 16, 2003.

Schaar-Mitrea et al., "Hybrid Compresion of Video with Graphics in DTV Communication Systems," *IEEE Trans. on Consumer Electronics*, pp. 1007-1017 (2000).

Shamoon et al., "A Rapidly Adaptive Lossless Compression Algorithm for High Fidelity Audio Coding," *IEEE Data Compression Conf.*, pp. 430-439 (Mar. 1994).

Sullivan et al., "The H.264/AVC Advanced Video Coding Standard: Overview and Introduction to the Fidelity Range Extensions," 21 pp. (Aug. 2004).

Techsmith Corporation, "Techsmith Camtasia Screen Recorder SDK," 2 pp. (2001).

Techsmith Corporation, "Camtasia Feature of the Week: Quick Capture," 2 pp., document dated Jan. 4, 2001 [Downloaded from the World Wide Web on May 9, 2002].

Techsmith Corporation, "Camtasia Screen Recorder SDK DLL API User Guide," Version 1.0, 66 pp. (2001).

Techsmith Corporation, "Camtasia v.3.0.1—Readme.Txt," 19 pp. (Jan. 2002).

Tu et al., "Context-Based Entropy Coding of Block Transform Coefficients for Image Compression," *IEEE Transactions on Image Processing*, vol. 11, No. 11, pp. 1271-1283 (Nov. 2002).

Wien et al., "16 Bit Adaptive Block Size Transforms," JVT-C107r1, 54 pp.

Wien, "Variable Block-Size Transforms for Hybrid Video Coding," Dissertation, 182 pp. (Feb. 2004).

Zhang, "Robust Decoding for Reduced Error Propagation of DC/AC Prediction Errors," 2001 Proceedings of Workshop and Exhibition on MPEG-4, 2001, 4 pages.

Bell et al., "Text Compression," *Prentice Hall*, pp. 105-107, 1990.

Davis, "The AC-3 Multichannel Coder," *Dolby Laboratories Inc.*, Audio Engineering Study, Inc., Oct. 1993.

Chang et al., "A Simple Block-Based Lossless Image Compression Scheme," *Asilomar Conf. on Signals, Systems, and Computers*, vol. 1, pp. 591-595 (Nov. 1996).

Memon, "Adaptive coding of DCT coefficients by Golomb-Rice codes," *IEEE Conf. On Image Processing*, pp. 516-520 (Oct. 1998).

Puri et al., "Improvements in DCT Based Video Coding," *Proc. SPIE*, vol. 3024, pp. 676688 (Feb. 1997).

Said et al., "Low-Complexity Waveform Coding via Alphabet and Sample-Set Partitioning," *SPIE Proc.—Society for Optical Engineering*, vol. 3024, No. 1, pp. 25-37 (Feb. 1997).

Stearns, "Arithmetic Coding in Lossless Waveform Compression," *IEEE Trans. on Signal Processing*, pp. 1874-1879 (Aug. 1995).

Todd et al., "Parameter Reduction and Context Selection for Compression of Gray-Scale Images," *British Journal of Photography*, pp. 188-193 (Mar. 1985).

Weinberger et al., "The LOCO-I Lossless Image Compression Algorithm: Principles and Standardization into JPEG-LS," *IEEE Trans. on Image Processing*, vol. 9, No. 8, pp. 1309-1324 (Aug. 2000).

\* cited by examiner

Figure 10

```
1000   Constants:
           MODELWEIGHT = 70
           Weight0[3] = { 240/*DC*/, 12/*LP*/, 1/*HP*/ }
           Weight1[3][16] = {  /* upto 16 channels permitted */
               { 0,240,120,80,  60,48,40,34,  30,27,24,22,  20,18,17,16 },
               { 0,12,6,4,      3,2,2,2,      2,1,1,1,      1,1,1,1 },
               { 0,16,8,5,      4,3,3,2,      2,2,2,1,      1,1,1,1 }
           }
           Weight2[6] = { 120,37,2/*YUV 420*/,
                          120,18,1/*YUV 422*/ }

Model data structure:
           CAdaptiveModel {
               FLCState  /* internal state running from -8 to 7*/
                         /* FLCState is initialized to zero */
               FLCBits   /* k */
                         /* FLCBits is initialized to 0 for highpass,
       */
                         /* 4 for lowpass and 8 for DC */
           }

Function UpdateModelMB (
           Int Band,       /* band 0/1/2 => DC/LP/HP */
           COLORFORMAT cf,/* image color format */
           Int Channels,  /* number of chroma channels <= 16 */
           Int Count[],   /* number of coefficients in luma & chroma
       bands */
           CAdaptiveModel Model)
       {

/* Normalization */
           iLaplacianMean[0] *= Weight0[Band]
           if (cf == YUV_420) {
               iLaplacianMean[1] *= Weight2[Band]
           }
           else if (cf == YUV_422) {
               iLaplacianMean[1] *= aWeight2[3 + Band]
           }
           else {
               iLaplacianMean[1] *= Weight1[Band][iChannels - 1]
               if (Band == HP)
                   iLaplacianMean[1] >>= 4
           }
       ...
```

/* Loop over luma & chroma */
     for (j = 0; j < 2; j++) {
         iLM = Count[j]
         iMS = Model.FLCState[j]

/* Calculate deviation from baseline */
         iDelta = (iLM - MODELWEIGHT) >> 2

/* Too few coefficients in the previous MB ? */
         if (iDelta < -8) {
             iDelta += 4   /* hysteresis */
             if (iDelta < -16)
                 iDelta = -16
             iMS += iDelta
             if (iMS < -8) {
                 if (Model.FLCBits [j] == 0)
                     iMS = -8
                 else {
                     iMS = 0
                     Model.FLCBits[j]-- /* bump k down */
                 }
             }
         }
/* Too many coefficients in the previous MB ? */
         else if (iDelta > 8) {
             iDelta -= 4   /* hysteresis */
             if (iDelta > 15)
                 iDelta = 15
             iMS += iDelta
             if (iMS > 8) {
                 iMS = 0
                 Model.FLCBits [j]++   /* bump k up */
                 if (Model.FLCBits [j] > 16)
                     Model.FLCBits [j] = 16
             }
         }

Model.FLCState[j] = iMS
     }
}
```

1000 (cont.)

Software 1280 Implementing Adaptive
Wide-range Coefficient Coding/Decoding

ADAPTIVE TRUNCATION OF TRANSFORM COEFFICIENT DATA IN A TRANSFORM-BASED DIGITAL MEDIA CODEC

CROSS REFERENCE TO RELATED APPLICATIONS

This application claims the benefit of U.S. Provisional 60/891,035; filed Feb. 21, 2007 and is incorporated herein by reference.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Block Transform-Based Coding

Transform coding is a compression technique used in many audio, image and video compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

More specifically, a typical block transform-based codec 100 shown in FIG. 1 divides the uncompressed digital image's pixels into fixed-size two dimensional blocks $(X_1, \ldots X_n)$, each block possibly overlapping with other blocks. A linear transform 120-121 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 130 (i.e., reduced in resolution, such as by dropping least significant bits of the coefficient values or otherwise mapping values in a higher resolution number set to a lower resolution), and also entropy or variable-length coded 130 into a compressed data stream. At decoding, the transform coefficients will inversely transform 170-171 to nearly reconstruct the original color/spatial sampled image/video signal (reconstructed blocks $\hat{X}_1, \ldots \hat{X}_n$).

The block transform 120-121 can be defined as a mathematical operation on a vector x of size N. Most often, the operation is a linear multiplication, producing the transform domain output y=M x, M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations. The matrix multiplication is applied separably along each dimension of the data (i.e., both rows and columns).

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 150, the inverse of these operations (dequantization/entropy decoding 160 and inverse block transform 170-171) are applied on the decoder 150 side, as show in FIG. 1. While reconstructing the data, the inverse matrix $M^{-1}$ (inverse transform 170-171) is applied as a multiplier to the transform domain data. When applied to the transform domain data, the inverse transform nearly reconstructs the original time-domain or spatial-domain digital media.

In many block transform-based coding applications, the transform is desirably reversible to support both lossy and lossless compression depending on the quantization factor. With no quantization (generally represented as a quantization factor of 1) for example, a codec utilizing a reversible transform can exactly reproduce the input data at decoding. However, the requirement of reversibility in these applications constrains the choice of transforms upon which the codec can be designed.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks.

Entropy Coding of Wide-Range Transform Coefficients

Wide dynamic range input data leads to even wider dynamic range transform coefficients generated during the process of encoding an image. For instance, the transform coefficients generated by an NxN DCT operation have a dynamic range greater than N times the dynamic range of the original data. With small or unity quantization factors (used to realize low-loss or lossless compression), the range of quantized transform coefficients is also large. Statistically, these coefficients have a Laplacian distribution as shown in FIGS. 2 and 3. FIG. 2 shows a Laplacian distribution for wide dynamic range coefficients. FIG. 3 shows a Laplacian distribution for typical narrow dynamic range coefficients.

Conventional transform coding is tuned for a small dynamic range of input data (typically 8 bits), and relatively large quantizers (such as numeric values of 4 and above). FIG. 3 is therefore representative of the distribution of transform coefficients in such conventional transform coding. Further, the entropy encoding employed with such conventional transform coding can be a variant of run-level encoding, where a succession of zeroes is encoded together with a non-zero symbol. This can be an effective means to represent runs of zeroes (which occur with high probability), as well as capturing inter-symbol correlations.

On the other hand, conventional transform coding is less suited to compressing wide dynamic range distributions such as that shown in FIG. 2. Although the symbols are zero with higher probability than any other value (i.e., the distribution peaks at zero), the probability of a coefficient being exactly zero is miniscule for the wide dynamic range distribution. Consequently, zeroes do not occur frequently, and run length entropy coding techniques that are based on the number of zeroes between successive non-zero coefficients are highly inefficient for wide dynamic range input data.

The wide dynamic range distribution also has an increased alphabet of symbols, as compared to the narrow range distribution. Due to this increased symbol alphabet, the entropy table(s) used to encode the symbols will need to be large. Otherwise, many of the symbols will end up being escape coded, which is inefficient. The larger tables require more memory and may also result in higher complexity.

The conventional transform coding therefore lacks versatility—working well for input data with the narrow dynamic range distribution, but not on the wide dynamic range distribution.

SUMMARY

A digital media coding and decoding technique and realization of the technique in a digital media codec described herein achieves more effective compression of wide dynamic range transform coefficients. For example, one exemplary block transform-based digital media codec illustrated herein represents wide dynamic range transform coefficients in two parts: a normalized coefficient and bin address. The normalized coefficient relates to a grouping of coefficient values of the wide dynamic range into bins, whereas the bin address is an index of the coefficient value within a bin. With careful selection of the bin size, the normalized coefficient part of the transform coefficients has a probability distribution more similar to that of narrow range transform coefficients, which is better suited to variable length entropy coding.

The exemplary codec uses variable length entropy coding to encode the normalized coefficients in a "core" of the compressed bitstream, and fixed length coding to encode the bin address as a separate optional layer that can be omitted. The presence of omission of the optional layer containing the bit address portion of transform coefficients can be efficiently signaled by bands present information in the bitstream syntax. Even with the bin address layer omitted, the codec can decode the bitstream and reconstruct an approximation of the input digital media data. The grouping of the transform coefficients in bins has a similar effect to quantization of the transform coefficients to a narrower dynamic range.

The codec further adaptively varies the bin size of the grouping based on a backward adaptation process to adjust the normalized coefficients toward a probability distribution well suited for efficient variable length entropy coding. In the exemplary codec, the adaptation is based on a count of the non-zero normalized coefficients in previous blocks. In this way, the adaptation depends only on information in the core bitstream, which does not violate the constraint that the layer containing the bin address can be selectively omitted.

The codec further permits adaptively truncating data carried in the optional layer, by the encoder or potentially a transcoder of the bitstream. The use of adaptive truncation is signaled in the image header, and separate truncation can be signaled for different regions of tiles of the image. The technique has minimal signal overhead in primary usage scenarios (where the optional layer is coded), while preserving the flexibility for adaptive truncation of the optional layer to meet bitrate or compressed file size constraints.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 10 and 11 are a pseudo-code listing of the adaptation process of FIG. 9.

DETAILED DESCRIPTION

The following description relates to coding and decoding techniques that adaptively adjust for more efficient entropy coding of wide-range transform coefficients. The following description describes an example implementation of the technique in the context of a digital media compression system or codec. The digital media system codes digital media data in a compressed form for transmission or storage, and decodes the data for playback or other processing. For purposes of illustration, this exemplary compression system incorporating this adaptive coding of wide range coefficients is an image or video compression system. Alternatively, the technique also can be incorporated into compression systems or codecs for other 2D data. The adaptive coding of wide range coefficients technique does not require that the digital media compression system encodes the compressed digital media data in a particular coding format.

1. Encoder/Decoder

Figure 4:
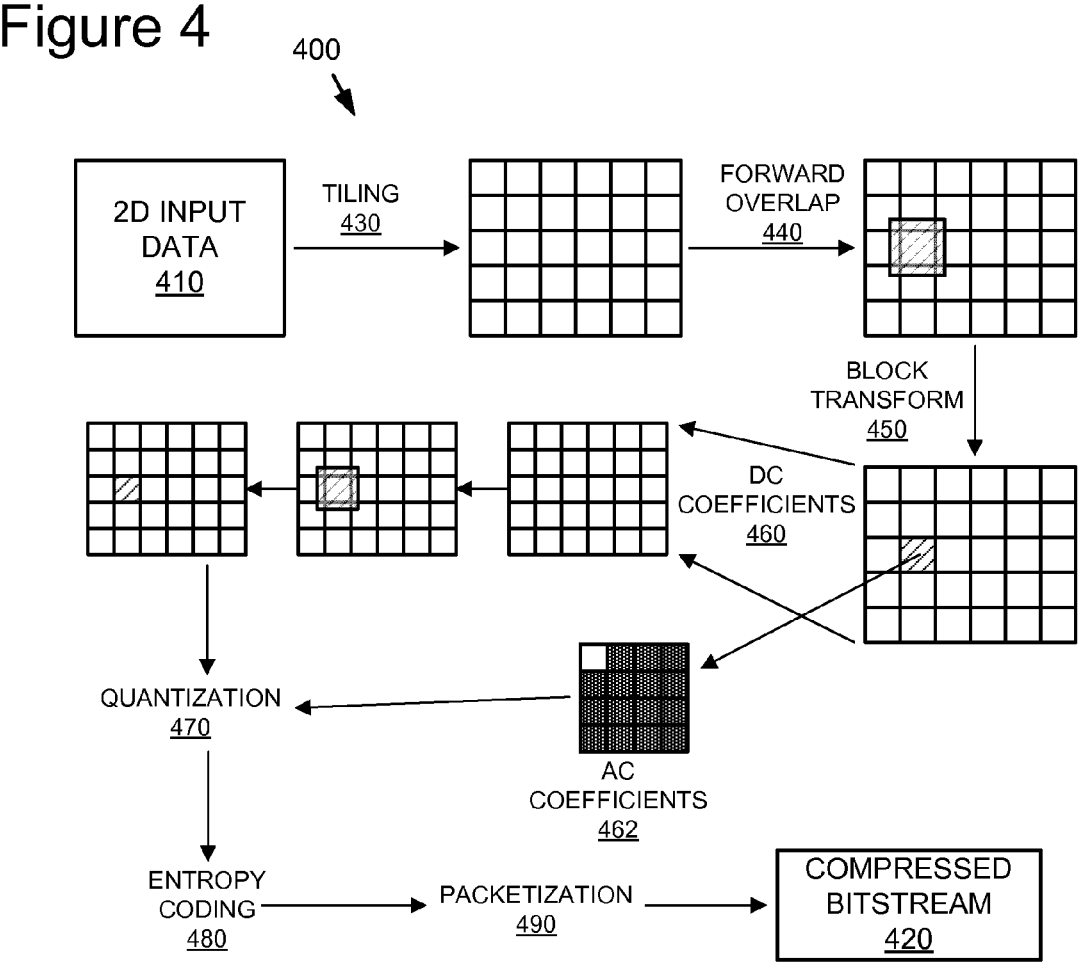
FIG. 4 is a flow diagram of a representative encoder incorporating the adaptive coding of wide range coefficients.
Figure 5:
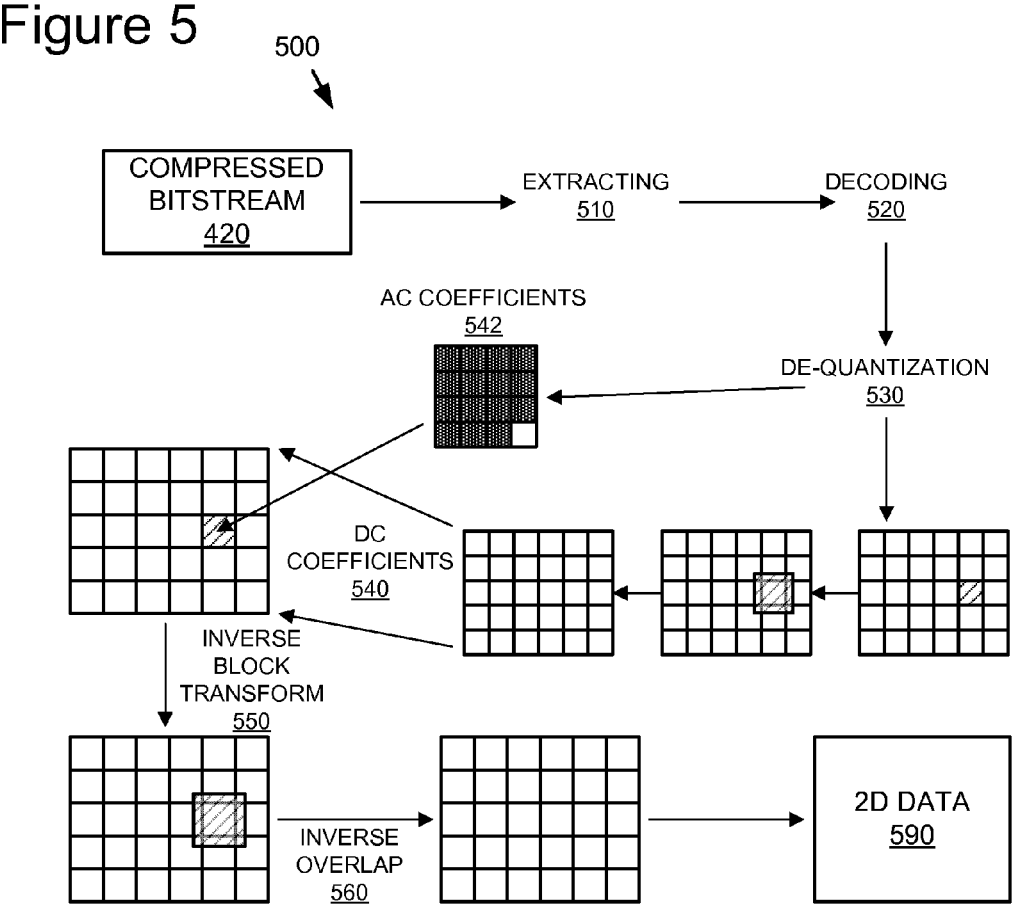
FIG. 5 is a flow diagram of a decoder incorporating the decoding of adaptively coded wide range coefficients.

FIGS. 4 and 5 are a generalized diagram of the processes employed in a representative 2-dimensional (2D) data encoder 400 and decoder 500. The diagrams present a generalized or simplified illustration of a compression system incorporating the 2D data encoder and decoder that implement the adaptive coding of wide range coefficients. In alternative compression systems using the adaptive coding of wide range coefficients, additional or fewer processes than those illustrated in this representative encoder and decoder can be used for the 2D data compression. For example, some encoders/decoders may also include color conversion, color formats, scalable coding, lossless coding, macroblock modes, etc. The compression system (encoder and decoder) can provide lossless and/or lossy compression of the 2D data, depending on the quantization which may be based on a quantization parameter varying from lossless to lossy.

The 2D data encoder 400 produces a compressed bitstream 420 that is a more compact representation (for typical input) of 2D data 410 presented as input to the encoder. For example, the 2D data input can be an image, a frame of a video sequence, or other data having two dimensions. The 2D data encoder tiles 430 the input data into macroblocks, which are 16×16 pixels in size in this representative encoder. The 2D data encoder further tiles each macroblock into 4×4 blocks. A "forward overlap" operator 440 is applied to each edge between blocks, after which each 4×4 block is transformed using a block transform 450. This block transform 450 can be the reversible, scale-free 2D transform described by Srinivasan, U.S. patent application Ser. No. 11/015,707; entitled, "Reversible Transform For Lossy And Lossless 2-D Data Compression," filed Dec. 17, 2004. The overlap operator 440 can be the reversible overlap operator described by Tu et al., U.S. patent application Ser. No. 11/015,148; entitled, "Reversible Overlap Operator for Efficient Lossless Data Compression," filed Dec. 17, 2004; and by Tu et al., U.S. patent application Ser. No. 11/035,991; entitled, "Reversible 2-Dimensional Pre-/Post-Filtering For Lapped Biorthogonal Transform," filed Jan. 14, 2005. Alternatively, the discrete cosine transform or other block transforms and overlap operators can be used. Subsequent to the transform, the DC coefficient 460 of each 4×4 transform block is subject to a similar processing chain (tiling, forward overlap, followed by 4×4 block transform). The resulting DC transform coefficients and the AC transform coefficients are quantized 470, entropy coded 480 and packetized 490.

The decoder performs the reverse process. On the decoder side, the transform coefficient bits are extracted 510 from their respective packets, from which the coefficients are themselves decoded 520 and dequantized 530. The DC coefficients 540 are regenerated by applying an inverse transform, and the plane of DC coefficients is "inverse overlapped" using a suitable smoothing operator applied across the DC block edges. Subsequently, the entire data is regenerated by applying the 4×4 inverse transform 550 to the DC coefficients, and the AC coefficients 542 decoded from the bitstream. Finally, the block edges in the resulting image planes are inverse overlap filtered 560. This produces a reconstructed 2D data output.

Figure 1:
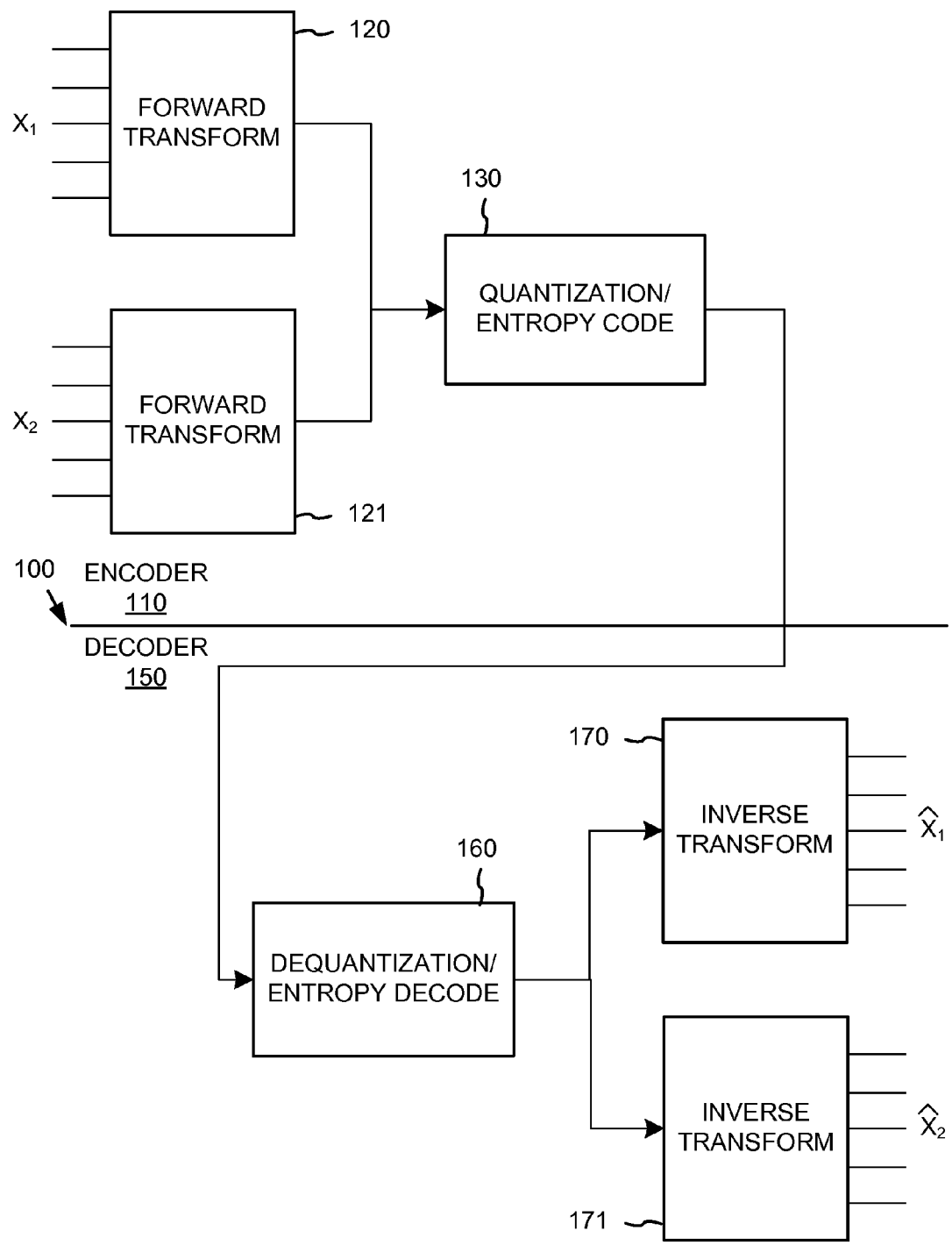
FIG. 1 is a block diagram of a conventional block transform-based codec in the prior art.
Figure 2:
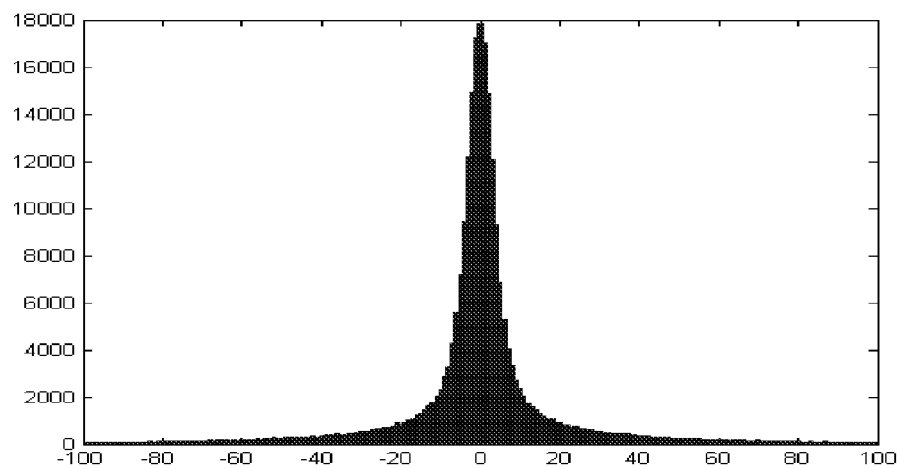
FIG. 2 is a histogram showing a distribution of transform coefficients having a wide dynamic range.

In an exemplary implementation, the encoder 400 (FIG. 2) compresses an input image into the compressed bitstream 420 (e.g., a file), and the decoder 500 (FIG. 5) reconstructs the original input or an approximation thereof, based on whether lossless or lossy coding is employed. The process of encoding involves the application of a forward lapped transform (LT) discussed below, which is implemented with reversible 2-dimensional pre-/post-filtering also described more fully below. The decoding process involves the application of the inverse lapped transform (ILT) using the reversible 2-dimensional pre-/post-filtering.

The illustrated LT and the ILT are inverses of each other, in an exact sense, and therefore can be collectively referred to as a reversible lapped transform. As a reversible transform, the LT/ILT pair can be used for lossless image compression.

The input data 410 compressed by the illustrated encoder 400/decoder 500 can be images of various color formats (e.g., RGB/YUV4:4:4 or YUV4:2:0 color image formats). Typically, the input image always has a luminance (Y) component. If it is a RGB/YUV4:4:4 or YUV4:2:0 image, the image also has chrominance components, such as a U component and a V component. The separate color planes or components of the image can have different spatial resolutions. In case of an input image in the YUV 4:2:0 color format for example, the U and V components have half of the width and height of the Y component.

As discussed above, the encoder 400 tiles the input image or picture into macroblocks. In an exemplary implementation, the encoder 400 tiles the input image into 16×16 macroblocks in the Y channel (which may be 16×16 or 8×8 areas in the U and V channels depending on the color format). Each macroblock color plane is tiled into 4×4 regions or blocks. Therefore, a macroblock is composed for the various color formats in the following manner for this exemplary encoder implementation:

1. For a grayscale image, each macroblock contains 16 4×4 luminance (Y) blocks.
2. For a YUV4:2:0 format color image, each macroblock contains 16 4×4 Y blocks, and 4 each 4×4 chrominance (U and V) blocks.
3. For a RGB or YUV4:4:4 color image, each macroblock contains 16 blocks each of Y, U and V channels.

2. Adaptive Coding of Wide-Range Coefficients

In the case of wide dynamic range data, especially decorrelated transform data (such as, the coefficients 460, 462 in the encoder of FIG. 4), a significant number of lower order bits are unpredictable and "noisy." In other words, there is not much correlation in the lower order bits that can be used for efficient entropy coding. The bits have a high entropy, approaching 1 bit for every bit encoded.

2.1 Grouping

Figure 3:
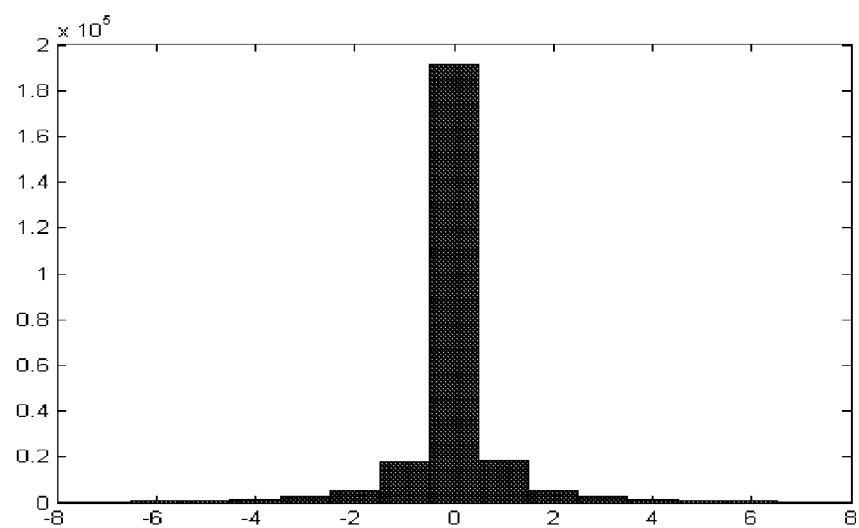
FIG. 3 is a histogram showing a distribution of narrow range coefficients.

Further, the Laplacian probability distribution function of wide range transform coefficients shown in FIG. 3 is given by $$\frac{\lambda}{2} e^{-\lambda |x|}$$

(for convenience, the random variable corresponding to the transform coefficients is treated as a continuous value). For wide dynamic range data, $\lambda$ is small, and the absolute mean $1/\lambda$ is large. The slope of this distribution is bounded within $\pm\frac{1}{2}(\lambda^2)$, which is very small. This means that the probability of a transform coefficient being equal to x is very close to the probability of $x+\xi$ for a small shift $\xi$. In the discrete domain, this translates to the claim, "the probability of a transform coefficient taking on adjacent values j and j+1) is almost identical."

Figure 6:
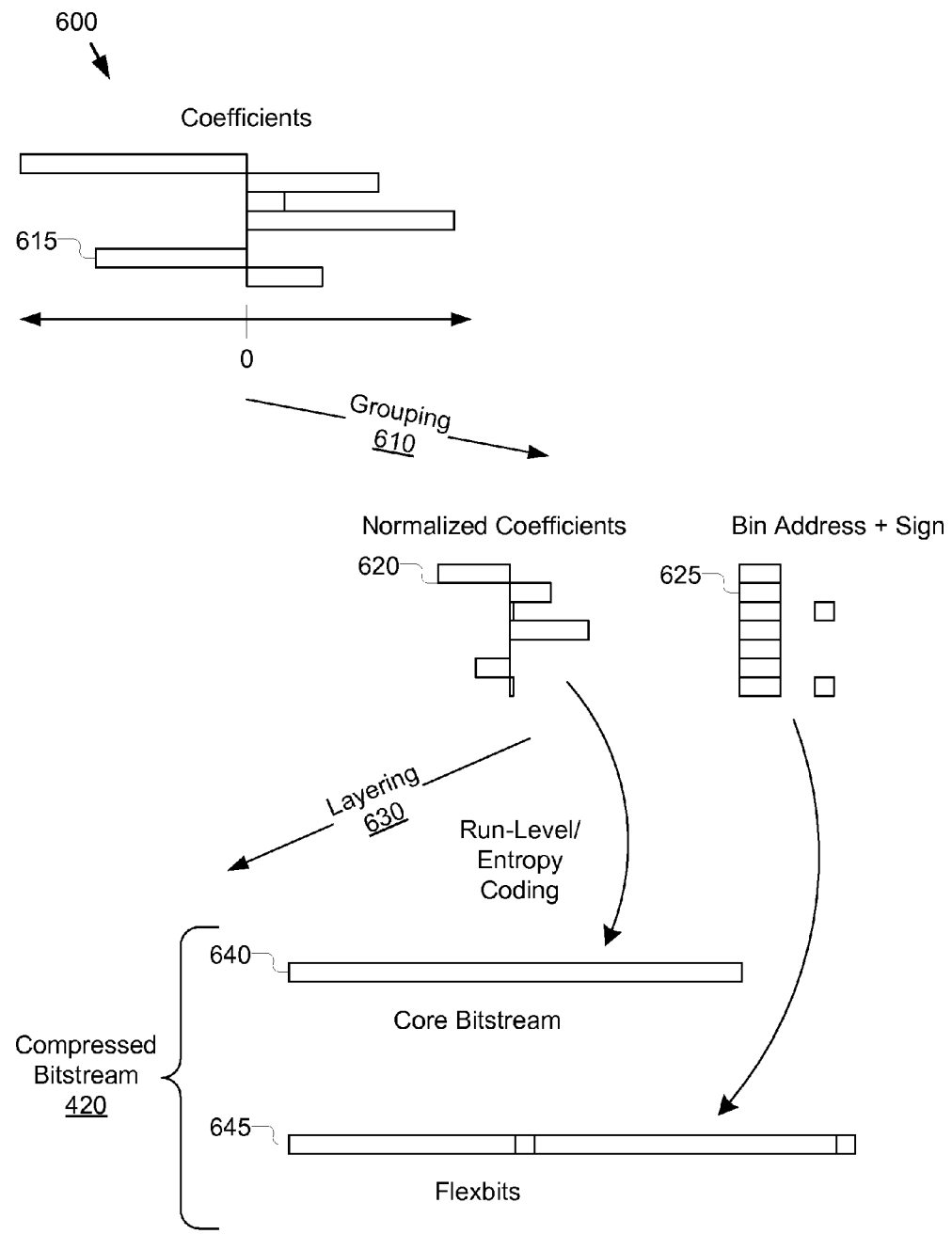
FIG. 6 is a flow diagram illustrating grouping and layering of transform coefficient in the adaptive coding of wide range coefficients, such as in the encoder of FIG. 4.

With reference now to FIG. 6, the adaptive coding of wide-range coefficients performs a grouping 610 of successive symbols of the alphabet into "bins" of N symbols. The number of symbols per bin can be any number N. For practicality, however, the number N is desirably a power of 2 (i.e., $N=2^k$), so that the index or address of a coefficient within a bin can be encoded efficiently as a fixed length code. For example, the symbols can be grouped into pairs, such that a symbol can be identified as the index of the pair, together with the index of the symbol within the pair.

This grouping has the benefit that with a suitable choice of N, the probability distribution of the bin index for wide range coefficients more closely resembles the probability distribution of narrow range data, e.g., that shown in FIG. 3. The grouping is mathematically similar to a quantization operation. This means that the bin index can be efficiently encoded using variable length entropy coding techniques that work best with data having the narrow range probability distribution.

Based on the grouping of coefficients into bins, the encoder can then encode a transform coefficient 615 using an index of its bin (also referred to herein as the normalized coefficient 620) and its address within the bin (referred to herein as the bin address 625). The normalized coefficient is encoded using variable length entropy coding, while the bin address is encoded by means of a fixed length code.

The choice of N (or equivalently, the number of bits k for the fixed length coding of the bin address) determines the granularity of grouping. In general, the wider the range of the transform coefficients, the larger value of k should be chosen. When k is carefully chosen, the normalized coefficient Y is zero with high probability that matches the entropy coding scheme for Y.

As described below, the value k can be varied adaptively (in a backward-adaptive manner) in the encoder and decoder. More specifically, the value of k on both the encoder and decoder varies based on the previously encoded/decoded data only.

In one particular example of this encoding shown in FIG. 7, the encoder encodes a transform coefficient X as follows. For an initial action 710, the encoder calculates a normalized coefficient Y for the transform coefficient. In this example implementation, the normalized coefficient Y is defined as $Y=\text{sign}(X)*\text{floor}(\text{abs}(X)/N)$, for a certain choice of bin size $N=2^k$. The encoder encodes the symbol Y using an entropy code (action 720), either individually or jointly with other symbols. Next, at action 730, the encoder determines a bin address (Z) of the transform coefficient X. In this example implementation, the bin address is the remainder of the integer division of abs(X) by the bin size N, or $Z=\text{abs}(X) \% N$. The encoder encodes this value as a fixed length code of k bits at action 740. Further, in the case of a non-zero transform coefficient, the encoder also encodes the sign. More specifically, as indicated in actions 750-760, the encoder encodes the sign of the normalized coefficient (Y) when the normalized coefficient is non-zero. Further, in the case that the normalized coefficient is zero and the transform coefficient is non-zero, the encoder encodes the sign of the transform coefficient (X). Since the normalized coefficient is encoded using a variable length entropy code, it is also referred to herein as the variable length part, and the bin address (Z) is also referred to as the fixed length part. In other alternative implementations, the mathematical definitions of the normalized coefficient, bin address and sign for a transform coefficient can vary.

Figure 7:
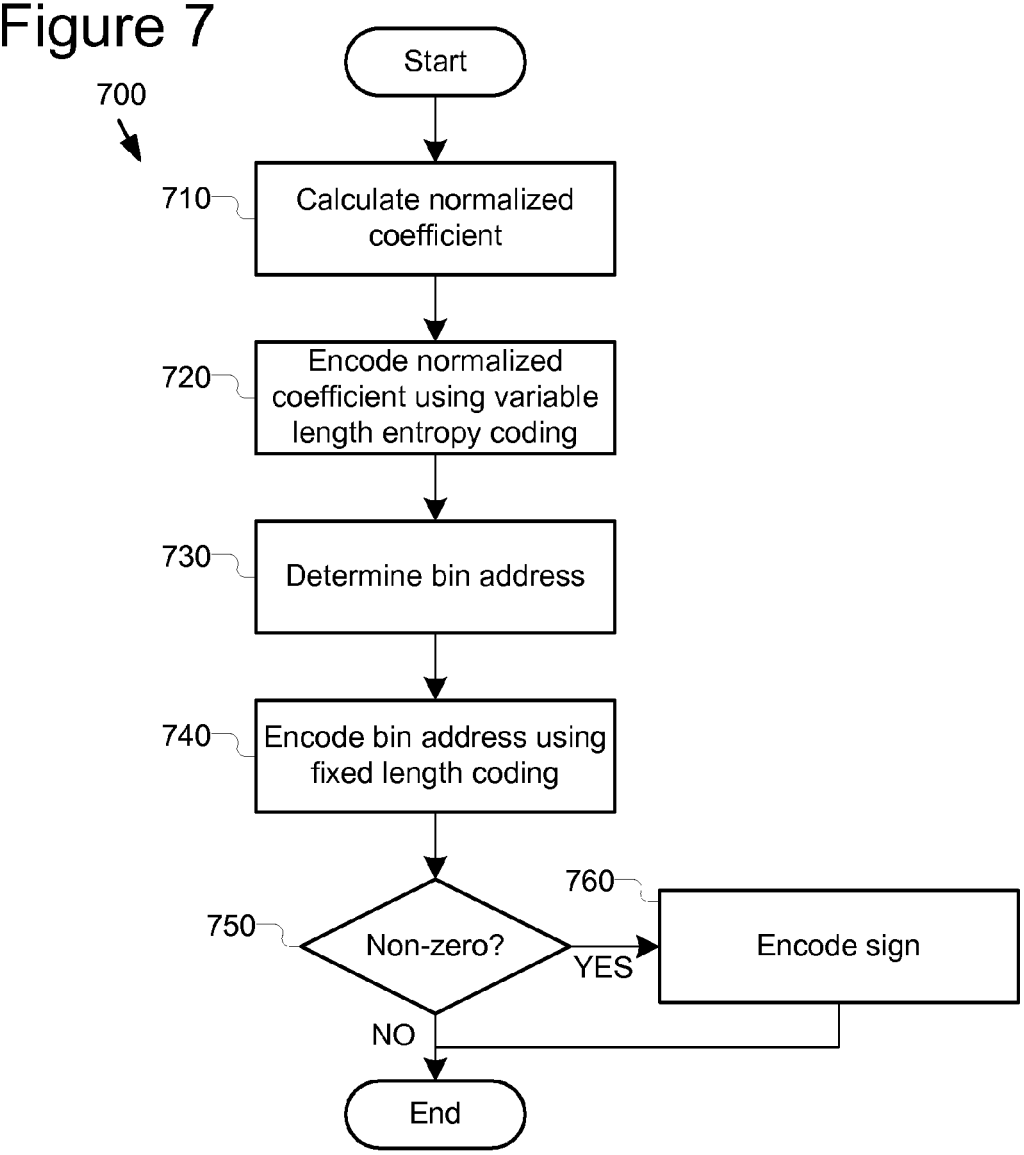
FIG. 7 is a flow chart showing a process by the encoder of FIG. 4 to encode a transform coefficient for a chosen grouping of transform coefficients in bins.
Figure 8:
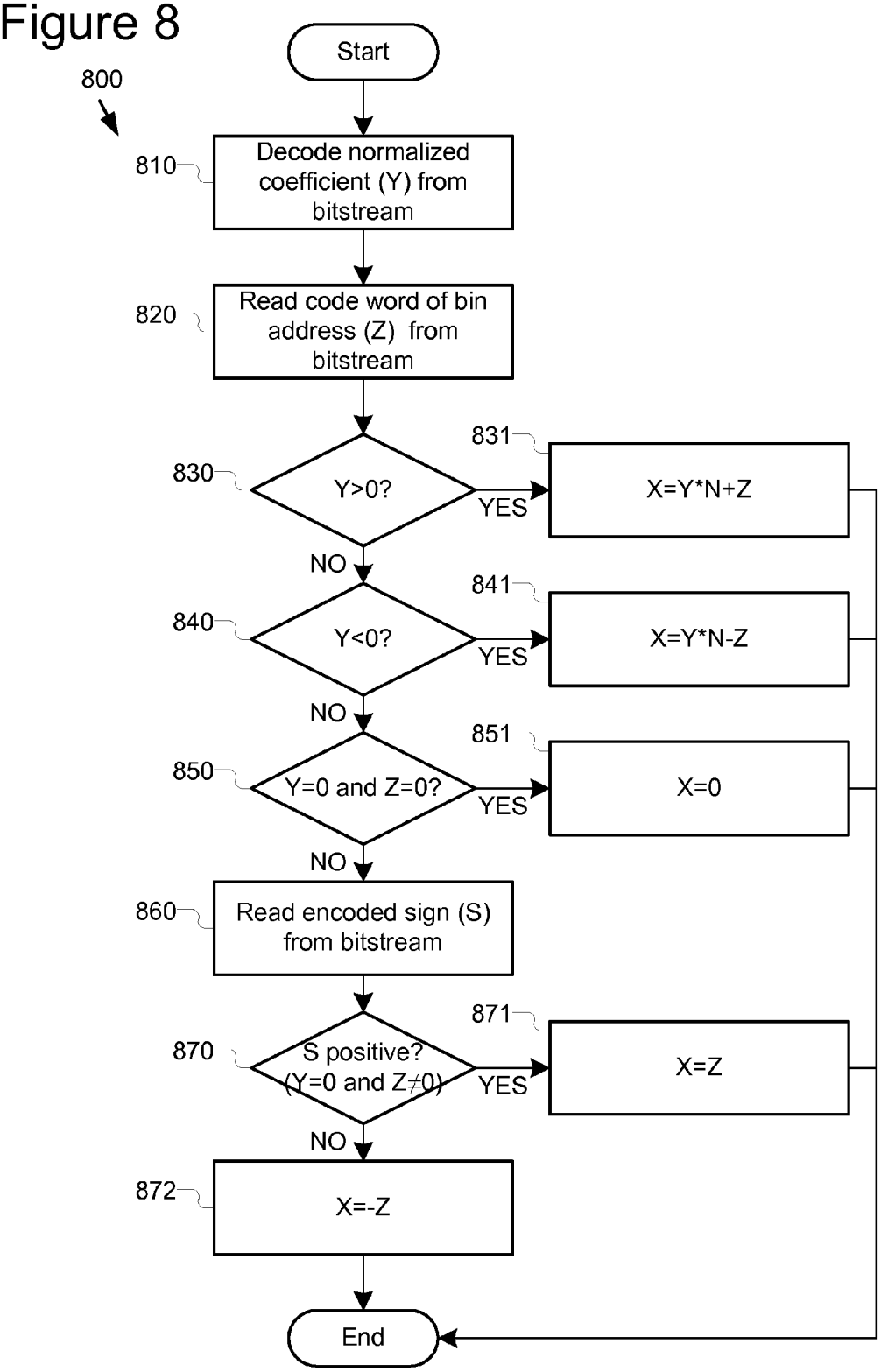
FIG. 8 is a flow chart showing a process by the decoder of FIG. 5 to reconstruct the transform coefficient encoded via the process of FIG. 7.

Continuing this example, FIG. 8 shows an example process 800 by the decoder 500 (FIG. 5) to reconstruct the transform coefficient that was encoded by the process 700 (FIG. 7). At action 810, the decoder decodes the normalized coefficient (Y) from the compressed bitstream 420 (FIG. 5), either individually or in conjunction with other symbols as defined in the block coding process. The decoder further reads the k-bit code word for the bin address and the sign (when encoded) from the compressed bitstream at action 820. At actions 830 to 872, the decoder then reconstructs the transform coefficient, as follows:

1. When Y>0 (action 830), then the transform coefficient is reconstructed as X=Y*N+Z (action (831)).
2. When Y<0 (action 840), then the transform coefficient is reconstructed as X=Y*N−Z (action 841).
3. When Y=0 and Z=0 (action 850), then the transform coefficient is reconstructed as X=0 (action 851).
4. When Y=0 and Z≠0; the decoder further reads the encoded sign (S) from the compressed bitstream (action 860). If the sign is positive (S=0) (action 870), then the transform coefficient is reconstructed as X=Z (action 871). Else, if the sign is negative (S=1), the transform coefficient is reconstructed as X=−Z (action 872).

2.2 Layering

With reference again to FIG. 6, the encoder and decoder desirably abstracts out the fixed length coded bin addresses 625 and sign into a separate coded layer (herein called the "Flexbits" layer 645) in the compressed bitstream 420 (FIG. 4). The normalized coefficients 620 are encoded in a layer of the core bitstream 640. This allows the encoder and/or decoder the option to downgrade or entirely drop this Flexbits portion of the encoding, as desired, to meet bit rate or other constraints. Even with the encoder entirely dropping the Flexbits layer, the compressed bitstream would still decode, albeit at a degraded quality. The decoder could still reconstruct the signal from the normalized coefficients portion alone. This is effectively similar to applying a greater degree of quantization 470 (FIG. 4) in the encoder. The encoding of the bin addresses and sign as a separate flexbits layer also has the potential benefit that in some encoder/decoder implementations, a further variable length entropy coding (e.g., arithmetic coding, Lempel-Ziv, Burrows-Wheeler, etc.) could be applied to the data in this layer for further improved compression.

For layering, sections of the compressed bitstream containing the flexbits portion are signaled by a separate layer header or other indication in the bitstream so that the decoder can identify and separate (i.e., parse) the Flexbits layer 645 (when not omitted) from the core bitstream 640.

Layering presents a further challenge in the design of backward adaptive grouping (described in the following section). Since the Flexbits layer may be present or absent in a given bitstream, the backward-adaptive grouping model cannot reliably refer to any information in the Flexbits layer. All information needed to determine the number of fixed length code bits k (corresponding to the bin size $N=2^k$) should reside in the causal, core bitstream.

2.3 Adaptation

The encoder and decoder further provide a backward-adapting process to adaptively adjust the choice of the number k of fixed length code bits, and correspondingly the bin size N of the grouping described above, during encoding and decoding. In one implementation, the adaptation process can be based on modeling the transform coefficients as a Laplacian distribution, such that the value of k is derived from the Laplacian parameter λ. However, such a sophisticated model would require that the decoder perform the inverse of the grouping 610 (reconstructing the transform coefficients from both the normalized coefficients in the core bitstream 640 and the bin address/sign in the Flexbits layer 645) in FIG. 6 prior to modeling the distribution for future blocks. This requirement would violate the layering constraint that the decoder should permit dropping the Flexbits layer from the compressed bitstream 420.

Figure 9:
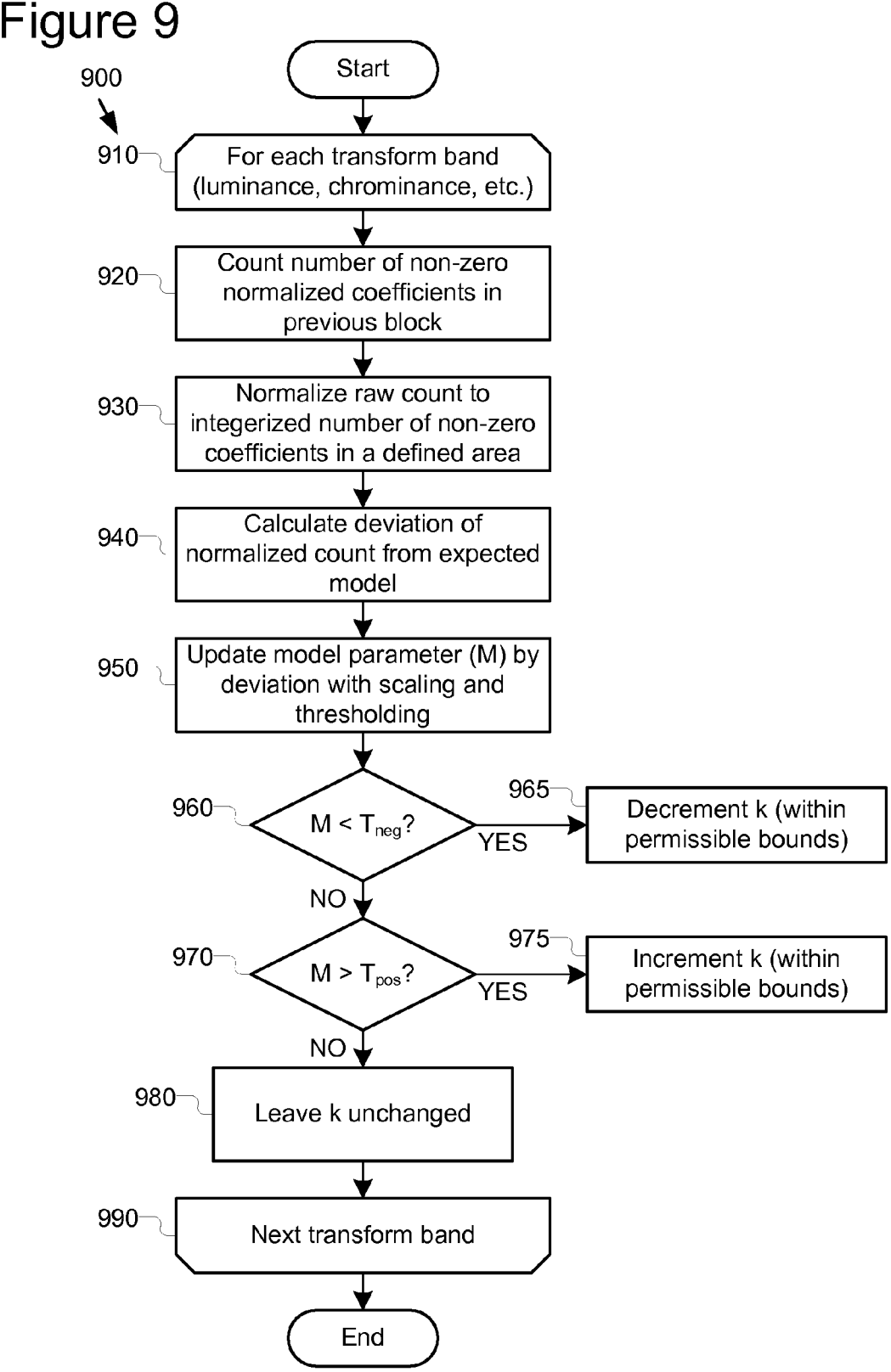
FIG. 9 is a flow chart showing an adaptation process for adaptively varying the grouping in FIG. 6 to produce a more optimal distribution for entropy coding of the coefficients.

In the example implementation shown in FIG. 9, the adaptation process 900 is instead based on the observation that a more optimal run-length encoding of the transform coefficients is achieved when around one quarter of the coefficients are non-zero. Thus, an adaptation parameter that can be used to tune the grouping towards a "sweet-spot" situation where around three-fourths of the normalized coefficients are zero will provide good entropy coding performance. Accordingly, the number of non-zero normalized coefficients in a block is used as the adaptation parameter in the example implementation. This adaptation parameter has the advantage that it depends only upon the information contained in the core bitstream, which meets the layering constraint that the transform coefficients can still be decoded with the Flexbits layer omitted. The process is a backward adaptation in the sense that the adaptation model applied when encoding/decoding the current block is based on information from the previous block(s).

In its adaptation process, the example encoder and decoder performs the adaptation on a backward adaptation basis. That is to say, a current iteration of the adaptation is based on information previously seen in the encoding or decoding process, such as in the previous block or macroblock. In the example encoder and decoder, the adaptation update occurs once per macroblock for a given transform band, which is intended to minimize latency and cross dependence. Alternative codec implementations can perform the adaptation at different intervals, such as after each transform block.

In the example encoder and decoder, the adaptation process 900 updates the value k. If the number of non-zero normalized coefficient is too large, then k is bumped up so that this number will tend to drop in future blocks. If the number of non-zero normalized coefficients is too small, then k is reduced with the expectation that future blocks will then produce more non-zero normalized coefficients because the bin size N is smaller. The example adaptation process constrains the value k to be within the set of numbers {0, 1, . . . 16}, but alternative implementations could use other ranges of values for k. At each adaptation update, the encoder and decoder either increments, decrements, or leaves k unchanged. The example encoder and decoder increments or decrements k by one, but alternative implementations could use other step sizes.

The adaptation process 900 in the example encoder and decoder further uses an internal model parameter or state variable (M) to control updating of the grouping parameter k with a hysteresis effect. This model parameter provides a lag before updating the grouping parameter k, so as to avoid causing rapid fluctuation in the grouping parameter. The model parameter in the example adaptation process has 16 integer steps, from −8 to 8.

With reference now to FIG. 9, the example adaptation process 900 proceeds as follows. This example adaptation process is further detailed in the pseudo-code listing of FIGS. 10 and 11. At indicated at actions 910, 990, the adaptation process in the example encoder and decoder is performed separately on each transform band being represented in the compressed bitstream, including the luminance band and chrominance bands, AC and DC coefficients, etc. Alternative codecs can have vary in the number of transform bands, and further can apply adaptation separately or jointly to the transform bands.

At action 920, the adaptation process then counts the number of non-zero normalized coefficients of the transform band within the immediate previously encoded/decoded macroblock. At action 930, this raw count is normalized to reflect the integerized number of non-zero coefficients in a regular size area The adaptation process then calculates (action 940) the deviation of the count from the desired model (i.e., the "sweet-spot" of one quarter of the coefficients being non-zero). For example, a macroblock of AC coefficients in the example encoder shown in FIG. 4 has 240 coefficients. So, the desired model is for 70 out of the 240 coefficients to be non-zero. The deviation is further scaled, thresholded, and used to update the internal model parameter.

At next actions 960, 965, 970, 975, the adaptation process then adapts the value k according to any change in the internal model parameter. If the model parameter is less than a negative threshold, the value k is decremented (within its permissible bounds). This adaptation should produce more non-zero coefficients. On the other hand, if the model parameter exceeds a positive threshold, the value k is incremented (within permissible bounds). Such adaptation should produce fewer non-zero coefficients. The value k is otherwise left unchanged.

Again, as indicated at actions 910, 980, the adaptation process is repeated separately for each channel and sub-band of the data, such as separately for the chrominance and luminance channels.

The example adaptation process 900 is further detailed in the pseudo-code listing 1000 shown in FIGS. 10 and 11.

3. Adaptive Truncation of Flexbits

As discussed in the preceding section, the representative encoder/decoder technique for adaptive coding of wide range coefficients partitions the high pass (AC) transform coefficients into separate components of the compressed bitstream 420 (FIG. 4), with the more significant information (called the normalized transform coefficients 620) being entropy coded in the core bitstream 640 and less significant information of the transform coefficient sent in an optional "Flexbits" layer 645 (FIG. 6). The partition is determined by adaptive coefficient normalization technique described in the preceding section, which ensures that there is little compression benefit to entropy coding the information of the Flexbits layer. This coding of the less significant transform coefficient information in the optional Flexbits layer reduces the computational and memory complexity of entropy coding, at an insignificant cost to compression performance.

The Flexbits layer also provides bit-rate scalability as it represents a refinement layer which can be used to improve the quality of the decoded image. The Flexbits layer may be omitted or truncated to further reduce the size of the compressed image. This enables progressive decoding where a coarse reconstruction of the image may be obtained even if the Flexbits layer is unavailable or only partially available at the decoder.

This section describes a technique for adaptive truncation of the less significant transform coefficient information (e.g., Flexbits layer), which provides a way to flexibly meet a range of transcoding needs. With this technique, the Flexbits layer component of various regions or tiles of the image can be truncated by a different amount. This allows the encoder or a transcoder to preserve more information in the visually important regions of the image, and discard information (by truncation of the Flexbits component) in the less important regions of the image. The encoder or transcoder signal the adaptive truncation through syntax elements of the bitstream syntax described below.

Example Image Structure

Figure 13:
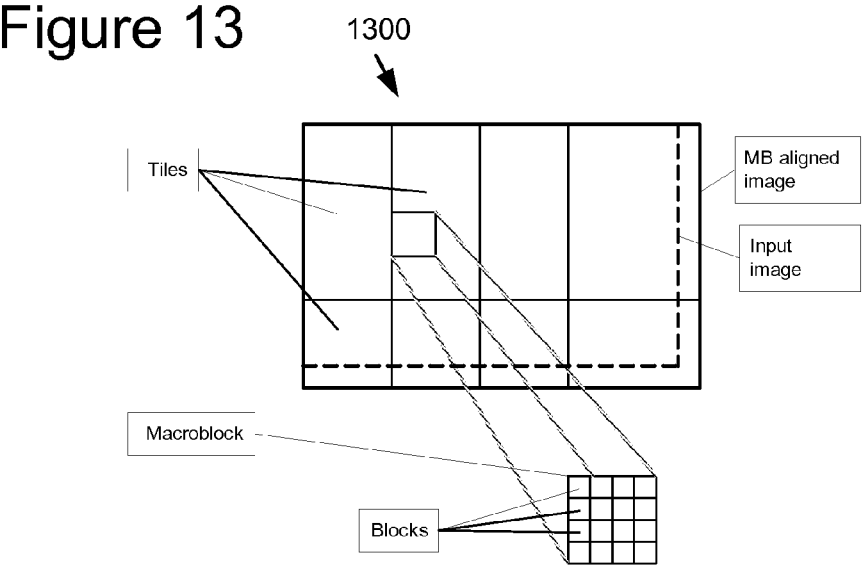
FIG. 13 is a diagram illustrating an image structure employed in the representative encoder/decoder of FIGS. 4 and 5.

FIG. 13 illustrates an example image structure for the representative encoder and decoder of FIGS. 4 and 5.

In the example image structure 1300, an image is as follows:

An image is composed of multiple color planes (or a single plane). The first color plane is referred to as luma and roughly corresponds to a monochrome representation of the image. The remaining color planes are referred to as chroma. Generally, luma and chroma planes are of the same size.

Grayscale images have no chroma planes.

For the special case of YUV 4:2:2; the chroma planes are half the width of the luma plane. The luma plane width is even.

For the special case of YUV 4:2:0; the chroma planes are half the width and half the height of the luma plane. The luma plane width and height are even.

In addition to the luma and chroma planes, an image may carry an alpha plane of the same size as the luma. This carries transparency information.

Each image is composed of non-overlapping 4×4 blocks. Blocks form a regular pattern on the plane.

Blocks cover the entire image, and may spill over the image boundaries. In this case, sample values outside of the image and within the block are discarded.

4×4 blocks are equally applicable to luma, chroma and alpha planes regardless of color format.

For color formats other than grayscale, YUV 4:2:0 and YUV 4:2:2; blocks of all color planes are collocated. Blocks of YUV 4:2:0 and YUV 4:2:2 chroma planes are collocated.

Further, blocks are grouped into non-overlapping 4×4 clusters, known as macroblocks. Each macroblock further contains blocks of all color planes.

Macroblocks form a regular pattern on the image.

Macroblocks of grayscale images are composed of 16 blocks.

Macroblocks of YUV 4:2:0 images are composed of 16 luma blocks, and 4 each of U and V plane blocks in a 2×2 pattern collocated with the 16 luma blocks.

Macroblocks of YUV 4:2:2 images are composed of 16 luma blocks, and 8 each of U and V plane blocks in a 4×2 pattern collocated with the 16 luma blocks.

Macroblocks of YUV 4:4:4 images are composed of 48 blocks, 16 for each plane in collocated 4×4 patterns, etc.

Macroblocks cover the entire image, and may spill over the image boundaries. In this case, sample values outside of the image and within the macroblock are discarded.

Macroblocks are grouped into regular structures called tiles.

Tiles form a regular pattern on the image—in other words, tiles in a horizontal row are of the same height and aligned; tiles in a vertical column are of the same width and aligned.

Subject to the above, tiles may be of arbitrary size which is a multiple of 16 and macroblock aligned.

An image may contain between 1 and 256 columns of tiles in the horizontal direction and between 1 and 256 rows of tiles in the vertical direction. Thus, an image may contain between 1 and 65536 tiles.

When an image contains one tile, it is said to be "untiled". If the number of tiles is greater than 1; the image is said to be "tiled".

Example Bitstream Syntax and Semantics

One example bitstream syntax and semantics for the representative encoder 400/decoder 500 is hierarchical and is comprised of the following layers: Image, Tile, Macroblock and Block.

|  | Num bits | Descriptor |
|---|---|---|
| Image (IMAGE) | | |
| IMAGE ( ){ | | |
|     IMAGE_HEADER | Variable | struct |
|     bAlphaPlane = FALSE | | |
|     IMAGE_PLANE_HEADER | Variable | struct |
|     if (ALPHACHANNEL_FLAG) { | | |
|         bAlphaPlane = TRUE | | |
|         IMAGE_PLANE_HEADER | Variable | Struct |
|     } | | |
|     INDEX_TABLE | Variable | struct |
|     TILE | Variable | struct |
| } | | |
| Image Header (IMAGE_HEADER) | | |
| IMAGE_HEADER ( ){ | | |
|     GDISIGNATURE | 64 | uimsbf |
|     RESERVED1 | 4 | uimsbf |
|     RESERVED2 | 4 | uimsbf |
|     TILING_FLAG | 1 | bool |
| | 1 | uimsbf |
| FREQUENCYMODE_BITSTREAM_FLAG | | |
|     IMAGE_ORIENTATION | 3 | uimsbf |
| | 1 | uimsbf |
| INDEXTABLE_PRESENT_FLAG | | |
|     OVERLAP_INFO | 2 | uimsbf |
|     SHORT_HEADER_FLAG | 1 | bool |
|     LONG_WORD_FLAG | 1 | bool |
|     WINDOWING_FLAG | 1 | bool |
|     TRIM_FLEXBITS_FLAG | 1 | bool |
|     RESERVED3 | 3 | uimsbf |
|     ALPHACHANNEL_FLAG | 1 | bool |
|     SOURCE_CLR_FMT | 4 | uimsbf |
|     SOURCE_BITDEPTH | 4 | uimsbf |
|     If (SHORT_HEADER_FLAG) { | | |

-continued

| | Num bits | Descriptor |
|---|---|---|
| WIDTH_MINUS1 | 16 | uimsbf |
| HEIGHT_MINUS1 | 16 | uimsbf |
| } | | |
| else { | | |
| WIDTH_MINUS1 | 32 | uimsbf |
| HEIGHT_MINUS1 | 32 | uimsbf |
| } | | |
| if (TILING_FLAG) { | | |
| NUM_VERT_TILES_MINUS1 | 12 | uimsbf |
| NUM_HORIZ_TILES_MINUS1 | 12 | uimsbf |
| } | | |
| for (n = 0; n < NUM_VERT_TILES_MINUS1; n++) { | | |
| If (SHORT_HEADER_FLAG) | | |
| WIDTH_IN_MB_OF_TILE_MINUS1[n] | 8 | uimsbf |
| else | | |
| WIDTH_IN_MB_OF_TILE_MINUS1[n] | 16 | uimsbf |
| } | | |
| for (n = 0; n < NUM_HORIZ_TILES_MINUS1; n++) { | | |
| If (SHORT_HEADER_FLAG) | | |
| HEIGHT_IN_MB_OF_TILE_MINUS1[n] | 8 | uimsbf |
| else | | |
| HEIGHT_IN_MB_OF_TILE_MINUS1[n] | 16 | uimsbf |
| } | | |
| if (WINDOWING_FLAG) { | | |
| NUM_TOP_EXTRAPIXELS | 6 | uimsbf |
| NUM_LEFT_EXTRAPIXELS | 6 | uimsbf |
| NUM_BOTTOM_EXTRAPIXELS | 6 | uimsbf |
| NUM_RIGHT_EXTRAPIXELS | 6 | uimsbf |
| } | | |
| } | | |
| IMAGE_PLANE_HEADER ( ) { | | |
| CLR_FMT | 3 | uimsbf |
| NO_SCALED_FLAG | 1 | bool |
| BANDS_PRESENT | 4 | uimsbf |
| if (CLR_FMT == YUV444) { | | |
| CHROMA_CENTERING | 4 | uimsbf |
| COLOR_INTERPRETATION | 4 | uimsbf |
| } | | |
| else if (CLR_FMT == NCHANNEL) { | | |
| NUM_CHANNELS_MINUS1 | 4 | uimsbf |
| COLOR_INTERPRETATION | 4 | uimsbf |
| } | | |
| if (SOURCE_CLR_FMT == BAYER) { | | |
| BAYER_PATTERN | 2 | uimsbf |
| CHROMA_CENTERING_BAYER | 2 | uimsbf |
| COLOR_INTERPRETATION | 4 | uimsbf |
| } | | |
| if (SOURCE_BITDEPTH ∈ {BD16,BD16S,BD32,BD32S}) { | | |
| SHIFT_BITS | 8 | uimsbf |
| } | | |
| if (SOURCE_BITEPTH == BD32F) { | | |
| LEN_MANTISSA | 8 | uimsbf |
| EXP_BIAS | 8 | uimsbf |
| } | | |
| DC_FRAME_UNIFORM | 1 | bool |
| if (DC_FRAME_UNIFORM) { | | |
| DC_QP( ) | variable | struct |
| } | | |
| if (BANDS_PRESENT != SB_DC_ONLY) { | | |
| USE_DC_QP | 1 | bool |
| if (USE_DC_QP == FALSE) { | | |
| LP_FRAME_UNIFORM | 1 | bool |
| if (LP_FRAME_UNIFORM) { | | |

-continued

| | Num bits | Descriptor |
|---|---|---|
| NUM_LP_QPS = 1 | | |
|   LP_QP( ) | variable | struct |
| } | | |
| } | | |
| if (BANDS_PRESENT != SB_NO_HIGHPASS) { | | |
|   USE_LP_QP | 1 | bool |
|   if (USE_LP_QP == FALSE) { | | |
|     HP_FRAME_UNIFORM | 1 | bool |
|     if (HP_FRAME_UNIFORM) { | | |
|       NUM_HP_QPS = 1 | | |
|       HP_QP( ) | variable | struct |
|     } | | |
|   } | | |
| } | | |
| } | | |
| FLUSH_BYTE | variable | |
| } | | |
| TILE ( ){ | | |
| if (FREQUENCYMODE_BITSTREAM_FLAG == SPATIALMODE) { | | |
|   for (n = 0; n < (NUM_HORIZ_TILES_MINUS1 + 1 ) * (NUM_VERT_TILES_MINUS1 + 1); n++) { | | |
|     seek(INDEX_OFFSET_TILE[n]) | | |
|     TILE_SPATIAL | variable | struct |
|   } | | |
| } | | |
| else { // FREQUENCYMODE_BITSTREAM_FLAG == FREQUENCYMODE | | |
|   for (n = 0; n < (NUM_HORIZ_TILES_MINUS1 + 1 ) * (NUM_VERT_TILES_MINUS1 + 1); n++) { | | |
|     seek(INDEX_OFFSET_TILE[n*NumBands]) | | |
|     TILE_DC | variable | struct |
|   } | | |
|   if(NumBands > 1) { | | |
|     for (n = 0; n < (NUM_HORIZ_TILES_MINUS1 + 1 ) * (NUM_VERT_TILES_MINUS1 + 1); n++) { | | |
|       seek(INDEX_OFFSET_TILE[n*NumBands+1]) | | |
|       TILE_LOWPASS | variable | struct |
|     } | | |
|   } | | |
|   if(NumBands > 2) { | | |
|     for (n = 0; n < (NUM_HORIZ_TILES_MINUS1 + 1 ) * (NUM_VERT_TILES_MINUS1 + 1); n++) { | | |
|       seek(INDEX_OFFSET_TILE[n*NumBands+2]) | | |
|       TILE_HIGHPASS | variable | struct |
|     } | | |
|   } | | |
|   if(NumBands > 3) { | | |
|     for (n = 0; n < (NUM_HORIZ_TILES_MINUS1 + 1 ) * (NUM_VERT_TILES_MINUS1 + 1); n++) { | | |
|       seek(INDEX_OFFSET_TILE[n*NumBands+3]) | | |
|       TILE_FLEXBITS | variable | struct |
|     } | | |
|   } | | |
| } | | |
| } | | |
| TILE_SPATIAL { | | |
| TILE_STARTCODE | 24 | uimsbf |
| if (TRIM_FLEXBITS_FLAG) | | |

|  | Num bits | Descriptor |
|---|---|---|
| TRIM_FLEXBITS | 4 | uimsbf |
| TILE_HEADER_DC | variable | struct |
| if (BANDS_PRESENT != SB_DC_ONLY) { | | |
|   TILE_HEADER_LOWPASS | variable | struct |
|   if (BANDS_PRESENT != | | |
|   SB_NO_HIGHPASS) | | |
|     { | | |
|     TILE_HEADER_HIGHPASS | variable | struct |
|     } | | |
| } | | |
| for (n = 0; n < NumMBInTile; n++) { | | |
|   if (BANDS_PRESENT != | | |
|   SB_DC_ONLY && | | |
|     NUM_LP_QPS > 1 && USE_DC_QP == | | |
|     FALSE) { | | |
|     LP_QP_INDEX | variable | uimsbf |
|     if (BANDS_PRESENT != | | |
|   SB_NO_HIGHPASS && | | |
|   NUM_HP_QPS > 1 && | | |
|   USE_LP_QP == FALSE) | | |
|     HP_QP_INDEX | variable | uimsbf |
|   } | | |
|   MB_DC(n) | variable | struct |
|   if (BANDS_PRESENT != SB_DC_ONLY) { | | |
|     MB_LP(n) | variable | struct |
|     if (BANDS_PRESENT != | | |
|   SB_NO_HIGHPASS) { | | |
|     MB_CBP(n) | variable | struct |
|       MB_HP(m) | variable | struct |
|       BLOCK_FLEXBITS(m) | variable | struct |
|     } | | |
|   } | | |
| } | | |
| FLUSH_BYTE | variable | |
| } | | |
| TILE_DC { | | |
| TILE_STARTCODE | 24 | uimsbf |
| TILE_HEADER_DC | variable | struct |
| for (n = 0; n < NumMBInTile; n++) { | | |
|   MB_DC(n) | variable | struct |
| } | | |
| FLUSH_BYTE | variable | |
| } | | |
| TILE_HEADER_DC { | | |
| if (DC_FRAME_UNIFORM == FALSE) | | |
|   DC_QP | variable | struct |
| } | | |
| TILE_LOWPASS { | | |
| TILE_STARTCODE | 24 | uimsbf |
| TILE_HEADER_LOWPASS | variable | struct |
| for (n = 0; n < NumMBInTile; n++) { | | |
|   if (NUM_LP_QPS > 1 && USE_DC_QP == | | |
|   FALSE) { | | |
|     LP_QP_INDEX | variable | uimsbf |
|     MBInfo[n].iQPIndexLP = | | |
|     LP_QP_INDEX | | |
|   } | | |
|   MB_LP(n) | variable | struct |
| } | | |
| FLUSH_BYTE | variable | |
| } | | |
| TILE_HEADER_LOWPASS { | | |
| if (LP_FRAME_UNIFORM == FALSE) { | | |
|   USE_DC_QP | 1 | bool |
|   if (USE_DC_QP == FALSE) { | | |
|     NUM_LP_QPS | 4 | uimsbf |
|     LP_QP | variable | struct |
|   } | | |
| } | | |
| } | | |
| TILE_HIGHPASS { | | |
| TILE_STARTCODE | 24 | uimsbf |
| TILE_HEADER_HIGHPASS | variable | struct |

-continued

| | Num bits | Descriptor |
|---|---|---|
| for (n = 0; n < NumMBInTile; n++) { | | |
|    if (NUM_HP_QPS > 1 && USE_LP_QP == | | |
|       FALSE) { | | |
|       HP_QP_INDEX | variable | uimsbf |
|    MBInfo[n] | | |
|    MB_CBP(n) | variable | struct |
|    MB_HP(n) | variable | struct |
| } | | |
| FLUSH_BYTE | variable | |
| } | | |
| TILE_HEADER_HIGHPASS { | | |
| if (HP_FRAME_UNIFORM == FALSE) { | | |
|    USE_LP_QP | 1 | bool |
|    if (USE_LP_QP == FALSE) { | | |
|       NUM_HP_QPS | 4 | uimsbf |
|       HP_QP ( ) | variable | struct |
|    } | | |
| } | | |
| } | | |
| TILE_FLEXBITS { | | |
| TILE_STARTCODE | 24 | uimsbf |
| if (TRIM_FLEXBITS_FLAG) | | |
|    TRIM_FLEXBITS | 4 | uimsbf |
| for (n = 0; n < NumMBInTile; n++) { | | |
|    MB_FLEXBITS(n) | variable | struct |
| } | | |
| FLUSH_BYTE | variable | |
| } | | |

Some selected bitstream elements from the example bitstream syntax and semantics are defined below.

Trim FlexBits Flag (TRIM_FLEXBITS_FLAG)(1 Bit)

In the example bitstream syntax, the TRIM_FLEXBITS_FLAG element is a 1-bit syntax element in the image header that specifies whether TRIM_FLEXBITS syntax element is present in each tile. A tile is an independently decodable bitstream layer associated with a partition of an image.

If TRIM_FLEXBITS_FLAG==1; the TRIM_FLEXBITS syntax element is present in every tile of the image. Otherwise, TRIM_FLEXBITS syntax element is not present in every tile of the image.

Trim Flexbits (TRIM_FLEXBITS)(4 Bits)

In the example bitstream syntax, the TRIM_FLEXBITS element is a 4 bit syntax element that is present in tiles carrying FLEXBITS information only if TRIM_FLEXBITS_FLAG==TRUE. Tiles carrying FLEXBITS information could be one of two types—(i) tiles that are in the spatial mode and (ii) tiles that are in the frequency mode and of type "FLEXBITS".

Otherwise, TRIM_FLEXBITS is not present, and its value shall be inferred to be zero.

Signaling Flexbits Truncation

The representative encoder uses the TRIM_FLEXBITS syntax to specify the degree of truncation of the FLEXBITS layer. If TRIM_FLEXBITS==0; no truncation has been performed on FLEXBITS.

The representative encoder can independently set the value of TRIM_FLEXBITS in each tile.

In the primary usage scenarios, either the FLEXBITS band is zero length, or there is no need or possibility to adhere to a file size constraint, and hence the signaling of TRIM_FLEXBITS is not required. In this case, the codec can eliminate the overhead information for signaling TRIM_FLEXBITS in each tile by setting TRIM_FLEXBITS_FLAG in the image header to zero. This helps compression efficiency.

However, if encoding or transcoding with the truncation of FLEXBITS is required, the codec can set TRIM_FLEXBITS_FLAG to one. The truncation of FLEXBITS in each tile can be performed independently, and can be adjusted to match the visual importance of the corresponding tile. The degree of truncation is signaled through TRIM_FLEXBITS.

TRIM_FLEXBITS may be set in a manner so as to match a particular bitrate constraint. This may be performed either by an encoder, or a transcoder. As an example, say an image compressed with a certain QP produces an encoded file size of 130 kB, of which 60 kB are FLEXBITS. Further, say that setting TRIM_FLEXBITS=2 reduces the FLEXBITS band to 25 kB. Then, in order to achieve a maximum file size constraint of 100 kB, an encoder may choose to encode with the same QP value but with TRIM_FLEXBITS set to 2. The resulting file size=(130−60)+25=95 kB.

Further, say the same image is divided into four tiles. By setting TRIM_FLEXBITS=2 for three tiles, and TRIM_FLEXBITS=1 for one tile, it may be possible to match the constraint with less deviation if, say, the file size associated with such a choice of TRIM_FLEXBITS is 98 kB.

In practice, an implementation of an encoder or a transcoder may operate as follows:

1. During the process of encoding or transcoding, count the number N(i) of FLEXBITS bits in the ith bit position starting with the LSB (i=1). Set N(0)=0.
2. For a certain maximum file size constraint S, compute the following:

$$\arg\max_i \left\{ S_0 - \sum_{j=0}^{i} N(j) \right\} \text{ where } S_0 - \sum_{j=0}^{i} N(j) \leq S$$

and $S_0$ is the size of the entire file.

3. Set TRIM_FLEXBITS to i as computed above. If i is zero, set TRIM_FLEXBITS_FLAG to 0.

Signaling Presence/Absence of Flexbits Layer

In the above described image header syntax, the representative encoder signals the presence or absence of various bands or layers of the bitstream, including the optional flexbits layer using a bands present syntax element, defined for the example bitstream syntax as follows:

Bands Present (BANDS_PRESENT)(4 Bits)

BANDS_PRESENT is a 4-bit syntax element in the image header that indicates whether the various frequency bands (layers) are present in the bitstream. The presence of the bands is specified by BANDS_PRESENT syntax element as defined in the following table:

| BANDS_PRESENT | Interpretation |
| --- | --- |
| 0 | ALL (All subbands are present) |
| 1 | NOFLEXBITS (Flexbits is not present) |
| 2 | NOHIGHPASS (Flexbits and Highpass are not present) |
| 3 | DCONLY (Only DC is present.) |
| 4 | ISOLATED |
| 5-15 | Reserved |

A bitstream which contains all the 4 layers would have the BANDS_PRESENT element set to zero.

A bitstream which contains the DC, LP and HP layers, but does not contain the FLEXBITS information would have BANDS_PRESENT set to one. The decoder uses the value of this syntax element to locate and decode only the layers that are present in the bitstream.

During transcoding, a transcoder may discard the flexbits layer to match the bitrate or compression size constraint, and changes the value of BANDS_PRESENT appropriately.

Note: the value SB_ISOLATED indicates that the bitstream cannot be decoded without external information. This mode may be used to transmit isolated enhancement layers, which may be decoded in conjunction with the lower frequency bands already known to the decoder. This approach could be used in progressive decoding applications. Another use of this mode is in distributed storage applications where the different frequency bands of image are stored in different locations, and combined externally when required.

4. Computing Environment

The above described encoder 400 (FIG. 4) and decoder 500 (FIG. 5) and techniques for adaptive coding/decoding of wide range coefficients can be performed on any of a variety of devices in which digital media signal processing is performed, including among other examples, computers; image and video recording, transmission and receiving equipment; portable video players; video conferencing; and etc. The digital media coding techniques can be implemented in hardware circuitry, as well as in digital media processing software executing within a computer or other computing environment, such as shown in FIG. 12.

Figure 12:
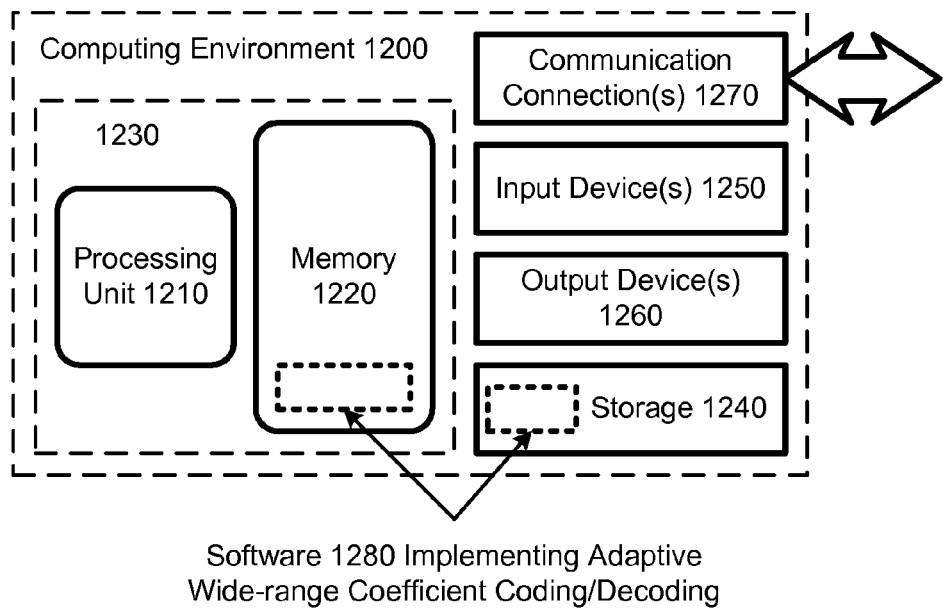
FIG. 12 is a block diagram of a suitable computing environment for implementing the adaptive coding of wide range coefficients of FIG. 6.

FIG. 12 illustrates a generalized example of a suitable computing environment (1200) in which described embodiments may be implemented. The computing environment (1200) is not intended to suggest any limitation as to scope of use or functionality of the invention, as the present invention may be implemented in diverse general-purpose or special-purpose computing environments.

With reference to FIG. 12, the computing environment (1200) includes at least one processing unit (1210) and memory (1220). In FIG. 12, this most basic configuration (1230) is included within a dashed line. The processing unit (1210) executes computer-executable instructions and may be a real or a virtual processor. In a multi-processing system, multiple processing units execute computer-executable instructions to increase processing power. The memory (1220) may be volatile memory (e.g., registers, cache, RAM), non-volatile memory (e.g., ROM, EEPROM, flash memory, etc.), or some combination of the two. The memory (1220) stores software (1280) implementing the described encoder/decoder and wide-range coefficient encoding/decoding techniques.

A computing environment may have additional features. For example, the computing environment (1200) includes storage (1240), one or more input devices (1250), one or more output devices (1260), and one or more communication connections (1270). An interconnection mechanism (not shown) such as a bus, controller, or network interconnects the components of the computing environment (1200). Typically, operating system software (not shown) provides an operating environment for other software executing in the computing environment (1200), and coordinates activities of the components of the computing environment (1200).

The storage (1240) may be removable or non-removable, and includes magnetic disks, magnetic tapes or cassettes, CD-ROMs, CD-RWs, DVDs, or any other medium which can be used to store information and which can be accessed within the computing environment (1200). The storage (1240) stores instructions for the software (1280) implementing the described encoder/decoder and wide-range coefficient encoding/decoding techniques.

The input device(s) (1250) may be a touch input device such as a keyboard, mouse, pen, or trackball, a voice input device, a scanning device, or another device that provides input to the computing environment (1200). For audio, the input device(s) (1250) may be a sound card or similar device that accepts audio input in analog or digital form, or a CD-ROM reader that provides audio samples to the computing environment. The output device(s) (1260) may be a display, printer, speaker, CD-writer, or another device that provides output from the computing environment (1200).

The communication connection(s) (1270) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available media that can be accessed within a computing environment. By way of example, and not limitation, with the computing environment (1200), computer-readable media include memory (1220), storage (1240), communication media, and combinations of any of the above.

The digital media processing techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

We claim:

1. A method of decoding digital media data, the method comprising:
   reading information of transform coefficients for a region of an image from a compressed bitstream, where a most significant information of the transform coefficients is contained in a core layer for the region in the bitstream and less significant information of the transform coefficients is contained in an optional layer of the bistream;
   reading at least one syntax element from the bitstream signaling truncation information of any truncation applied to the least significant information of the transform coefficients;
   processing the information of the transform coefficients in accordance with the signaled truncation information; and
   reconstructing an image from the processed information of the transform coefficients.

2. The method of claim 1, wherein the at least one syntax element comprises an image level syntax element signaling whether truncation is applied to less significant information of transform coefficients in the optional layers of any regions of the image.

3. The method of claim 1, wherein the at least one syntax element comprises a tile level syntax element signaling whether truncation is applied to less significant information of transform coefficients in the optional layers of the tile.

4. The method of claim 1, wherein the at least one syntax element comprises a tile level syntax element signaling a degree of truncation applied to less significant information of transform coefficients in the optional layers of the tile.

5. The method of claim 1, wherein the at least one syntax element comprises a syntax element signaled in each of multiple independently decodable bitstream layers associate with separate partitions of the image, which specifies whether truncation is applied to less significant information of transform coefficients in the optional layer for the respective partition.

6. The method of claim 1, wherein the at least one syntax element comprises a syntax element signaled in each of multiple independently decodable bitstream layers associate with separate partitions of the image, which specifies a degree of truncation applied to less significant information of transform coefficients in the optional layer for the respective partition, whereby the degree of truncation is variable among the separate partitions.

7. The method of claim 1, wherein the at least one syntax element comprises a syntax element signaled in each of the separately decodable partitions of the compressed bitstream, which specifies whether truncation is applied to the less significant portion of transform coefficients in the optional layer for the respective separately decodable partition.

8. The method of claim 1, wherein the at least one syntax element comprises a syntax element signaled in each of the separately decodable partitions of the compressed bitstream, which specifies a degree of truncation applied to the less significant portion of transform coefficients in the optional layer for the respective separately decodable partition, whereby the degree of truncation is variable among the separate partitions.

9. An image bitstream decoder, comprising:
   a memory for holding a compressed image bitstream encoded using a bitstream syntax defining a core layer containing a most significant portion of transform coefficient data for a region of an image and an optional layer containing a less significant portion of transform coefficient data for the region, the bitstream syntax further defining at least one syntax element signaling truncation information relating to any truncation being applied to the less significant portion of transform coefficient data in the optional layer;
   a processor operating to read the transform coefficient data and at least one syntax element from the compressed bitstream, and process the transform coefficient data based upon the truncation information to reconstruct the image; and
   an image display for presenting the image for viewing by a user.

10. The image bitstream decoder of claim 9, wherein the bitstream syntax defines an image layer containing information pertaining to the image as a whole, and separately decodable partitions corresponding to separate regions of the image each contain the core layer and optional layer, and wherein the at least one syntax element comprises an image level syntax element in the image layer to signal whether truncation is applied to less significant information of transform coefficients in the optional layers of the separately decodable partitions for regions of the image.

11. The image bitstream decoder of claim 10, wherein the at least one syntax element further comprises a syntax element in each separately decodable partition signaling a degree of truncation applied to the less significant portion of transform coefficient data in the optional layers of the respective separately decodable partition.

12. The image bitstream decoder of claim 9, wherein the at least one syntax element comprises a syntax element signaled in each of multiple independently decodable partitions of the bitstream associated with separate regions of the image, said syntax element specifying whether truncation is applied to the less significant portion of transform coefficient data in the optional layer of the respective independently decodable partition.

13. The image bitstream decoder of claim 9, wherein the at least one syntax element comprises a syntax element signaled in each of multiple independently decodable partitions of the bitstream associated with separate regions of the image, said syntax element specifying a degree of truncation applied to the less significant portion of transform coefficient data in the optional layer for the respective partition, whereby the degree of truncation is variable between the independently decodable partitions.

14. A method of coding an image as a compressed bitstream, the method comprising:
   for a separately decodable partition of the compressed bitstream associated with a region of the image, separately coding a most significant portion of transform coefficients into a core layer of the compressed bitstream and a less significant portion of the transform coefficients into an optional layer of the compressed bitstream;

determining to apply a truncation to the less significant portion of the transform coefficients in the optional layer to meet a desired bitrate constraint;

applying the truncation to the less significant portion of the transform coefficients in the optional layer; and signaling the applied truncation in the compressed bistream using at least one syntax element.

15. The method of claim 14 wherein said determining action comprises:

counting a number of bits in a least bit position of the less significant portion of the transform coefficients in the optional layer; and for a certain maximum file size constraint, calculating a degree of truncation of the less significant portion of the transform coefficient in the optional layer necessary to reduce the compressed bitstream in size to less than the maximum file size constraint.

16. The method of claim 14, wherein the at least one syntax element comprises an image level syntax element signaling whether truncation is applied to the less significant portion of the transform coefficients in the optional layers of the separately decodable partitions of the compressed bitstream.

17. The method of claim 14, wherein the at least one syntax element comprises a syntax element in each separately decodable partition signaling whether truncation is applied to the less significant portion of transform coefficients in the optional layer of the respective separately decodable partition.

18. The method of claim 14, wherein the at least one syntax element comprises a syntax element in each separately decodable partition signaling a degree of truncation applied to the less significant portion of transform coefficients in the optional layer of the respective separately decodable partition.

* * * * *